United States Patent [19]
Seto

[11] Patent Number: 5,260,740
[45] Date of Patent: Nov. 9, 1993

[54] METHOD OF DETECTING IMAGE FRAME AND APPARATUS THEREOF, METHOD OF POSITIONING IMAGE FRAME, PHOTOGRAPHIC FILM CARRIER, AND METHOD OF PRINTING PHOTOGRAPHIC FILM

[75] Inventor: Yasuhiro Seto, Kanagawa, Japan

[73] Assignee: Fuji Photo Film Co., Ltd., Kanagawa, Japan

[21] Appl. No.: 889,143

[22] Filed: May 27, 1992

[30] Foreign Application Priority Data

| May 28, 1991 | [JP] | Japan | 3-123854 |
| May 28, 1991 | [JP] | Japan | 3-123855 |
| May 28, 1991 | [JP] | Japan | 3-123858 |

[51] Int. Cl.⁵ .............................................. G03B 27/52
[52] U.S. Cl. ................................. 355/41; 355/50; 355/28; 355/29
[58] Field of Search ..................... 355/41, 50, 28, 29

[56] References Cited

U.S. PATENT DOCUMENTS

| 4,611,907 | 9/1986 | Inatsuki | 355/41 |
| 4,884,095 | 11/1989 | Yamanouchi et al. | 355/1 |
| 4,947,205 | 8/1990 | Benker et al. | 355/41 |

FOREIGN PATENT DOCUMENTS

| 52-2429 | 1/1977 | Japan . |
| 53-134422 | 11/1978 | Japan . |
| 54-103032 | 8/1979 | Japan . |
| 58-53537 | 12/1983 | Japan . |
| 1-130129 | 9/1989 | Japan . |
| 3-11329 | 1/1991 | Japan . |

OTHER PUBLICATIONS (English Abstract for 3-11329) Patent Abstracts of Japan (translated), Kokai No. 3-11329, published Jan. 18, 1991.
(English Abstract for 52-2429) Patent Abstracts of Japan (translated), Kokai No. 3-11329, published Jan. 10, 1977.
(English Abstract for 54-103032) Patent Abstracts of Japan (translated), Kokai No. 54-103032, published Aug. 14, 1979.
(English Abstract for 53-134422) Patent Abstracts of Japan (translated), Kokai No. 53-134422, published Nov. 24, 1978.

*Primary Examiner*—Richard A. Wintercorn
*Attorney, Agent, or Firm*—Sughrue, Mion, Zinn, Macpeak & Seas

[57] ABSTRACT

An image frame detecting apparatus of the present invention is provided with a light emitting portion provided in one of the respective sides of a guide path for a carrying photographic film, and including a light emitting diode (LED) array having a plurality of LEDs disposed in the transverse direction of the photographic film, a light receiving portion provided in the other of the respective sides of the guide path for the photographic film, and receiving light emitted from the light emitting portion, and a detecting portion for detecting an image frame recorded on the photographic film depending upon the quantity of light received by the light receiving portion. The LEDs has a reduced fluctuation and a reduced range of temperature change so that transmission density of the photographic film can be accurately detected. An image frame and a base portion of the photographic film can be surely discriminated. Further, the extended life of the LED allows to reduce a regular exchanging operation required when a cold-cathode tube or a halogen lamp or the like is used for a light source, and to improve a maintenance efficiency.

20 Claims, 17 Drawing Sheets

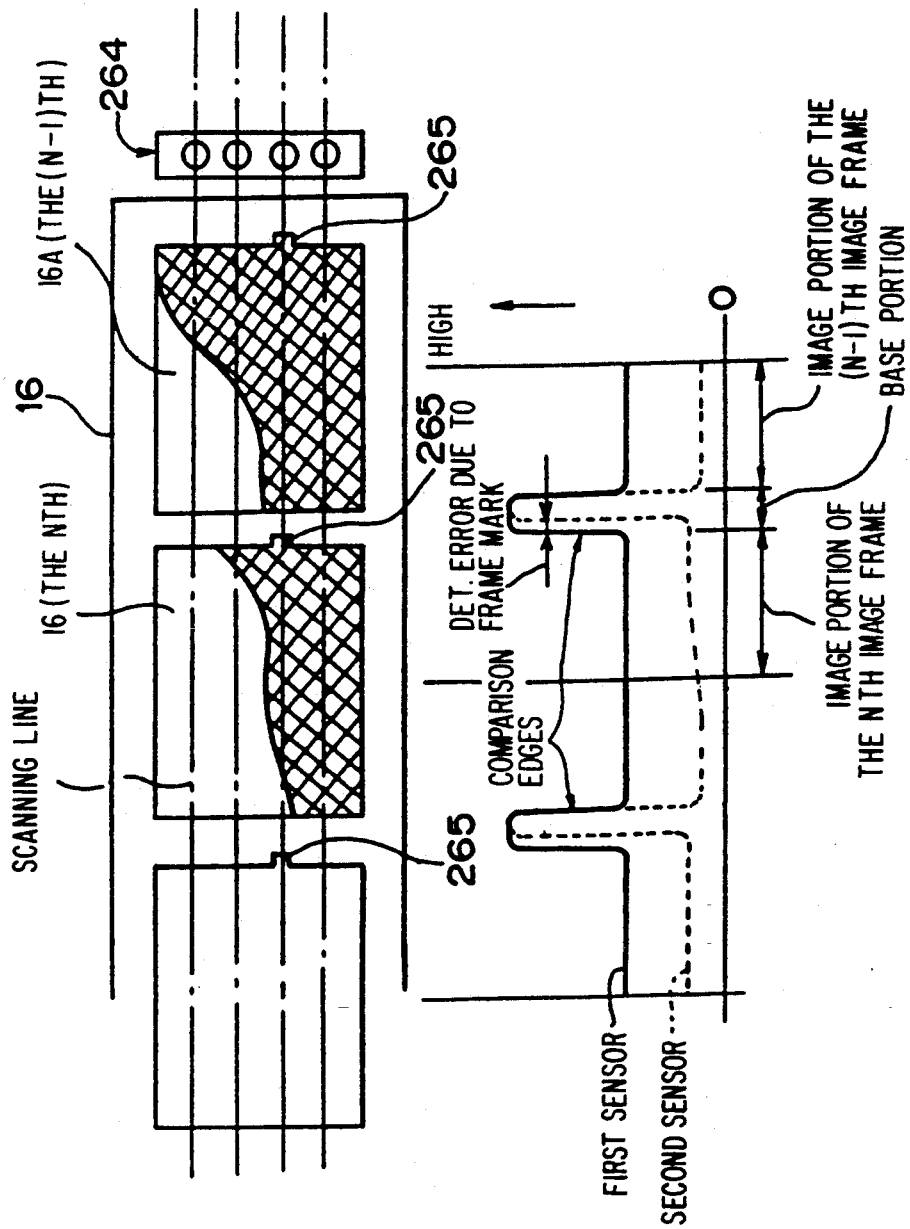

METHOD OF DETECTING IMAGE FRAME AND APPARATUS THEREOF, METHOD OF POSITIONING IMAGE FRAME, PHOTOGRAPHIC FILM CARRIER, AND METHOD OF PRINTING PHOTOGRAPHIC FILM

BACKGROUND OF THE INVENTION

1. Field of the Invention

The present invention relates to a method of detecting an image frame for detecting the image frame recorded on a photographic film and an apparatus thereof, a method of positioning the image frame, a photographic film carrier positioning each image frame at a printing position in order, and a method of printing the photographic film.

2. Description of the Related Art

A photoprinter is provided with a negative carrier at a print position for, in order, positioning image frames of a negative film at the print position after development of the film. The negative carrier comprises a base and a cover body which can open and close with respect to the base. The base has a negative film guide path provided with a printing opening corresponding to an image frame. The guide path has driving rollers at positions corresponding to the vicinities of both the transverse edges of the negative film. The driving rollers are rotated by a driving force of a pulse motor. The cover body is provided with idle rollers paired with the driving rollers to hold the negative film between the rollers and idle rollers. Thus, these driving rollers allow to hold and carry the negative film along the guide path when the cover body is closed and the negative film is inserted into the negative carrier from one side thereof.

A detecting apparatus for detecting an image frame edge is mounted upstream the printing opening of the guide path. The detecting apparatus, as disclosed in Japanese Patent Application Laid-Open No. 3-11329, is provided with a cold-cathode tube or a halogen lamp at the rear side of the guide path, and a slit hole formed in the guide path. In the detecting apparatus, each image frame of the negative film on the guide path is irradiated with a light emitted from the cold-cathode tube or halogen lamp.

The cover body is provided with a light receiving sensor corresponding to the slit hole so that light transmitted through the negative film can be received by the sensor. Transmission density of the negative film can be calculated based on quantity of received light detected by the light receiving sensor. Generally, a base portion of the negative film has a low transmission density while the negative film has a high transmission density within the range of the image frame. It is possible to compare a difference between the transmission density of the base portion and that of the image frame with the predetermined transmission density to detect a boundary between the image frame and the base portion, i.e., the image frame edge. The image frame edge allows to position the respective image frames of the negative film at the print position.

Therefore, it is possible to position each image frame of the negative film at the print position automatically and accurately even if the pitches of the respective image frames recorded on the negative film are fluctuated depending on feeding errors in photographing by a camera. Thus, the feeding error due to a quantitative feeding can be eliminated. In addition, the negative carrier itself can be simply constructed because it is not necessary to detect a notch provided for each image frame.

A cold-cathode tube or a halogen lamp serves as a light source to detect transmission density of the negative film. However, each light source is extremely degraded with the passage of time, and has a short life. Thus, the light source is so frequently exchanged to reduce a maintenance efficiency. A temperature change may cause the quantity of light to change. However, it is impossible to change the quantity of light easily since the cold-cathode tube or a halogen lamp has a complicated control system for the quantity of light. Further, if the quantity of light is changed, a quantity of light detected by light receiving sensor. Accordingly, a comparison valance is deviated between the quantity of light and a predetermined transmission density. As a result, it is impossible to detect the image frame edge accurately.

In addition, the light source such as the cold-cathode tube or the halogen lamp is a so-called surface light source. Thus, it is necessary to use an optical system such as a slit or a cylindrical lens to avoid an unsharp condition. As a result, an image frame edge detecting apparatus has a complicated structure, and the negative carrier itself has a large dimension.

In such a control for positioning, a front edge of each image frame generally serves as a reference edge when it is normally spaced from the preceding image frame. If abnormally spaced, it is detected whether or not the back edge of the image frame is normally spaced from the preceding image frame. If normally spaced, the back edge can be used as the reference edge. If neither front nor back edges are normally spaced, the negative film is quantitatively fed on the basis of a state where the preceding image frame is positioned.

However, in the conventional positioning method as set forth above, unstable detection may be made depending on the image frames recorded on the negative film. That is to say, in some cases, adjacent image frames may be overlapped with each other, it may be difficult to distinguish the image frame from the base portion due to overexposure, and the edge portion may be unclear due to overexposure. In these cases, the detected edge is incorrect per se so that accurate positioning may not be made even if it is tried on the basis of the preceding image frame.

Moreover, the negative film may have a rectangular photographed area projecting from the image frame, i.e., a so-called frame mark. The frame mark is disposed between the image frames so that the frame mark may be disposed across a light receiving line (in the carrying direction) of the light receiving sensor. Therefore, there is a drawback to erroneously detect a pointed end of the projection of the frame mark as the image frame edge.

In recent years, it has been desired to provide a camera for photographing on a so-called panoramic size image frame as well as so-called standard size image frames such as a full-size image frame and a half-size image frame. A printed photographic paper on which the panoramic size image frame has been printed is longer in the side corresponding to the longitudinal direction at the negative film than a photographic paper on which the full-size image frame has been printed. The panoramic size image frame has a shorter transverse length of the negative film than that of the standard size image frame, and is defined in a narrower form than the full-size image frame. Accordingly, a negative film may include both the standard size image frame and the panoramic size image frame.

However, the size of the image frames can not be selected by the conventional negative carrier. Thus, the size should be selected depending on an operator's visual check.

In the conventional negative carrier, a negative mask suitable for each size of the image frame is employed, and mounted on the printing opening. In order to process the negative film including image frames in both sizes, the negative mask is switched according to the size of each image frame to be detected and positioned so that image frames can be printed in the order of the image frames recorded on the negative film.

However, in the conventional printing method, the negative mask should be frequently switched depending on a condition including each size image frame to reduce the process efficiency. Further, an operation to sort the printed photographic papers according to their sizes requires more time period and results in a poor efficiency.

SUMMARY OF THE INVENTION

In view of the facts set forth hereinbefore, it is an object of the present invention to provide an image frame detecting apparatus which can accurately detect an image frame edge all the time irrespective of an accuracy, a performance or the like of adjustment for the quantity of light. The object ma be attained by detecting the image frame edge depending upon a relative difference of densities in the range detected in a single step.

Further, it is another object of the present invention to provide a method of detecting an image frame and a photographic film carrier. In the method of detecting the image frame, the photographic film carrier has an extended operating life. It is possible to improve a maintenance efficiency, and to reduced a variation of the quantity of light which is caused due to a temperature change. Furthermore, it is possible to facilitate a quantity control of light, and to position the image frame at a printing position surely.

In view of the facts set forth above, it is another object to provide a method of positioning an image frame. In the method, an image frame edge can be accurately detected irrespective of a photographed condition of the image frame.

Furthermore, it is another object of the present invention to provide a method of printing a photographic film. In the method, a size of the image frame can be automatically discriminated to check the discriminated result with the image frame disposed on a printing opening. Accordingly, the only image frame having the same size can be selected to print consecutively. As a result, it is possible to improve an operating efficiency and a process efficiency.

In a first aspect of the present invention, an image frame detecting apparatus comprises: a light emitting portion provided in one of the respective sides of a guide path for a carrying photographic film, and including a light emitting diode array having a plurality of light emitting diodes disposed along the transverse direction of the photographic film; a light receiving portion provided in the other of the respective sides of the guide path for the photographic film, and receiving light emitted from the light emitting portion; and a detecting portion for detecting an image frame recorded on the photographic film depending upon the quantity of light received by the light receiving portion.

According to the first aspect as constructed above, the light emitting portion includes a light emitting diode array having the plurality of light emitting diodes disposed along the transverse direction of the photographic film. The quantity of light emitted from the light emitting diode has a reduced fluctuation and a slight variation of the temperature change. Accordingly, no fluctuation is caused in the quantity of transmitted light of the photographic film, which is received by the light receiving portion. Therefore, it is possible to obtain the accurate quantity of transmitted light of the photographic film and to discriminate the image frame from a base portion surely.

The extended life of the light emitting diode allows to reduce a regular exchanging operation required when a cold-cathode tube or a halogen lamp or the like is used for a light source, and to improve a maintenance efficiency.

In the above aspect, the number of the plurality of light emitting diodes can be determined such that at least two colors are emitted from the light emitting diodes. At the time, quantities of the respective emitted color lights should be identical with each other. Namely, the plurality of light emitting diodes can be selected to emit at least two-color lights, and the number of the light emitting diodes can be determined to have the identical quantity of emitted light of each color. For example, R (red light) and Y (yellow light) are selected and arranged such that a ratio of R to Y is 1:2 since Y has a low luminous efficacy. That is to say, the light emitting diodes are arranged in the order of RYYRYYRYY ..., starting with one of the transverse directional ends of the photographic film. Hence, each quantity of light of each color becomes substantially uniform so that a quantity of transmitted light in a color image can be surely detected.

Though the light emitting diodes optimally include three colors, i.e., R, Y, and G (green light) and so on, a two-color light emitting diodes are enough to detect the image frame.

Further, in the first aspect, the light emitting diode may be constructed to emit a light only when the photographic film is carried. Namely, the light emitting diode is turned on only when the photographic film is moved. It is possible to turn on the light emitting diode only when the photographic film is carried since the light emitting diode can be responsively turned on and off. As a result, advantageously, the light emitting diode life can be extended and heat from the light emitting diode can be reduced.

According to the first aspect, the detecting portion may be constructed to detect a splice tape for coupling the photographic films with each other, a managing tape pasted on each photographic film, and a notch provided corresponding to each image frame depending upon the quantity of light received by the light receiving portion. Namely, in the detecting portion, the splice tape for joining the photographic films can be detected to process a plurality of the photographic films in a roll fashion by the light emitting portion (light emitting diode) and the light receiving portion. The managing tape on which a number such as an ID number is recorded, may be pasted on every photographic film. In the detecting portion, it can be detected whether there is the managing tape depending on the quantity of light received by the light receiving portion.

IRED (infrared emitting diode) or a near infrared emitting diode is required to detect each tape. That is to say, for example, the light emitting diode having infrared rays (in the range of 800 nm to 900 nm) should be arranged at a tape detecting position in the light emitting diode array.

A semi-circular notch, i.e., a so-called notch is provided at one of the respective transverse directional ends of the photographic film corresponding to each image frame. The notch serves as a reference for quantitatively feeding the photographic film to position an image frame at the printing position when the image frame can not be detected. If the light receiving portion is partially arranged corresponding to a position where the notch is formed, the detecting portion can detect the notch depending upon the quantity of light received by a part of the light receiving portion.

Namely, the detecting portion can be used as a secondary sensor to, for example, detect the splice tape as well as to detect the image frame.

A second aspect of the invention provides a method of detecting an image frame edge recorded on the carrying photographic film. The method comprises the steps of: adjusting the maximum value in quantities of light emitted from a plurality of light emitting diodes arranged in the transverse direction of the photographic film to the range of the quantity of received light which can be received by a plurality of light receiving portions in the condition where the photographic film is absent, and determining a correction of the quantity of received light depending upon an error of the quantity of received light in the respective light receiving portions; and detecting the image frame edge depending upon a distribution of the transmission density of the photographic film which can be obtained after correcting the quantity of receiving light.

According to the second aspect, the image frame edge is detected depending upon the quantity of received light to position the image frame at the printing position. To detect the quantity of received light accurately, it is necessary to grasp quantities of light emitted from the plurality of light emitting diodes and a light receiving condition in the light receiving portion. In the light emitting diode, the quantity of light is rarely degraded with the passage of time due to an intermittent lighting of the light emitting diode. The quantity of light is rarely varied due to a temperature change. Therefore, the light emitting diode may be initially adjusted.

That is to say, in the condition where the photographic film is absent, it is necessary to convert the quantity of received light into digital values to calculate. Accordingly, the range suitable for the conversion is defined. Thus, power supply for emitting the light emitting diode is adjusted to define the maximum value of the quantities of emitted light of the light emitting diode within the range of the quantity of received light which can be received by the light receiving portion.

Each light receiving portion may have each different quantity of received light due to, for example, an arranged condition of each light receiving portion even if each uniform quantity of light is emitted from the light emitting diodes. The correction is determined to compensate this deviation. The correction is defined as a correction coefficient to set the quantity of light received by each light receiving portion to a uniform value.

After completion of initial adjustment, the image frame edge is detected. While the photographic film is carried, the quantity of transmitted light from the light emitting diode is received by the light receiving portion. Each value received by each light receiving portion is compensated to obtain a compensated quantity of receiving light. In the quantity of receiving light, an image frame portion has a low quantity and a base portion has a high quantity. Therefore, the image frame edge is disposed at a position having a considerable fluctuation of the quantity of received light. The image frame edge detected as set forth above is defined corresponding to a feed amount on the basis of, for example, the printing position. A relative position is predetermined between a printing position X and an image frame edge detecting position Y. For example, when the photographic film is carried by a pulse motor, the carried interval can be defined as a difference of pulse reading numbers. If the pulse reading number is stored when the image frame edge is detected, an interval between X to Y is defined as an offset amount. Accordingly, the offset amount added to the pulse reading number makes a pulse reading number for positioning the image frame at the printing position X. Hence, the image frame edge can be accurately positioned at the printing position.

As set forth hereinbefore, the light emitting diode allows to position the image frame accurately at the printing position simply by initially adjusting, for example, the quantity of light.

In the second aspect, a temporary edge is defined depending upon the maximum point of the quantity of received light. The minimum point is selected within the range having the predetermined interval from the temporary edge. Accordingly, a middlemost position between the maximum point of the quantity of received light and the minimum point of that can be defined as the image frame edge.

Namely, to determine the image frame edge, it is general to detect the quantity of received light of the photographic film. The quantity of received light is detected when the photographic film is carried by a predetermined interval from an intermediate portion of the image frame to that of the adjacent image frame. The maximum point of the quantity of received light is defined within the predetermined interval. A point having a quantity of received light accounting for 90 to 95% of the maximum point of the quantity of received light is defined as a temporary edge. If the image frame has a fine exposure condition, the temporary edge is substantially identical with the actual image frame edge. However, if the image frame is underexposed or overexposed, variations occur in a distribution of transmission density. The temporary edge is not an accurate image frame edge. Hence, the minimum point is selected within the range having a predetermined interval from the temporary edge. Accordingly, a middlemost position between the maximum point of the quantity of received light and the minimum point of that is defined as the image frame edge. The definition allows to detect the image frame edge without a large error even if the image frame is underexposed or overexposed.

A third aspect of the invention provides a photographic film carrier used for carrying a photographic film on which image frames are consecutively recorded, and for positioning each image frame at the printing position in order. The photographic film carrier comprises: a base having a pass opening for exposing light provided at the printing position, and having a guide path for guiding the photographic film; a cover body which can be opened and closed on the guide path of the base; a plurality of light emitting diodes arrayed in the transverse direction of the photographic film upstream the printing position of the guide path, and passing light through the photographic film positioned on the guide path; a sensor mounted on the cover body to detect the transmitted light passing through the photographic film from the light emitting diodes; and a positioning control means for discriminating the image frame edge depending upon the quantity of received light detected by the sensor to position the image frame at the printing position.

According to the third aspect, a photographic film carrier is disposed in the vicinity of the printing position to position the image frame. The photographic film is carried along the guide path provided for the photographic film carrier. The guide path is provided with the printing opening. The image frame is positioned in order at the printing opening to perform a printing process after fixing the image frame by a mask mounted on the cover body.

A silt hole is formed in the guide path upstream the printing position, and a plurality of light emitting diodes are arranged on a back face of the guide path. Thus, light emitted from the light emitting diodes can be detected to obtain the quantity of received light. The quantity of light is received by the sensor through the photographic film carried on the guide path. The image frame edge is defined depending upon the quantity of received light. Thus, the image frame can be surely positioned at the printing position by the positioning control means.

As discussed hereinbefore, the photographic film carrier is provided with an image frame edge detecting function using the light emitting diodes as a light source. The photographic film carrier further includes a photographic film carrying function, and the printing opening. As a result, a compact structure can be implemented in an apparatus including each function.

A fourth aspect of the invention provides a method of printing a photographic film using a photoprinter including a switching means for enabling a negative mask for a standard size image frame and a negative mask for a panoramic size image frame to be switched over from one to another, and an image frame detecting apparatus detecting an image frame edge of the photographic film depending upon a quantity of transmission light of the photographic film carried on the guide path, the quantity of transmitted light received by a light receiving position upstream the printing opening. The method comprises the steps of: arraying a plurality of sensors along the transverse direction of the photographic film to form the light receiving portion, arranging at least one sensor of the plurality of sensors within a detecting range of the standard size image frame and outside a detecting range of the panoramic size image frame, and thereby, discriminating an image frame size; and skipping an image frame having a size which is not identical with a size of a negative mask disposed on the printing opening, and printing an image frame having the same size as that of the negative mask.

According to the fourth aspect, the switching means allows to position any one of the negative mask for the standard size image frame and the negative mask for the panoramic size image frame at the printing opening. Upstream the printing opening, the image frame edge to position is detected by the light receiving portion. Thus, it is possible to position the image frame edge at a predetermined position, and to position the image frame at the printing position. At least one of the sensors is disposed within the detecting range of the standard size image frame and outside the detecting range of the panoramic size image frame. In the sensor, a quantity of received light corresponding to a base density of the photographic film may be detected. Hence, it is detected that there is no image at the position detected by the sensor. Accordingly, the image frame can be defined as the panoramic size image frame. If the negative mask for the standard size image frame is selected on the printing opening by the switching means, a photographed area of the image frame is not identical with an image frame mask. Accordingly, the image frame is skipped and the printing process is passed. In such a way, the image frames having the same size are consecutively printed so that the operation efficiency can be improved. The skipped image frame may be positioned again in order after switched to negative mask corresponding to the skipped image frame, and may be printed.

As discussed above, the image frame size is discriminated and the size and that of the negative mask on the printing opening are checked while the image frame edge is detected. Thereby, the image frames having the same size are consecutively printed. Therefore, the operation efficiency can be improved in the printing process for the photographic film including both the standard size image frame and the panoramic size image frame.

A fifth aspect of the present invention provides a method of positioning an image frame, in which light emitted from the light emitting portion disposed at one of positions facing each other with a guide path between is received by the light receiving portion disposed at the other of the positions an image frame edge recorded on the photographic film is detected depending upon the quantity of the received light, and the detected image frame edge is positioned at a predetermined position. The method comprising the steps of: arraying a plurality of sensors along the transverse direction of the photographic film to form the light receiving portion, determining the maximum point of a first sensor disposed at a position having the highest distribution of the quantity of light received by each sensor and the minimum point of a second sensor disposed at a position having the lowest distribution of the quantity of light received by each sensor while the photographic film is being carried from a substantial intermediate portion of the (N−1)th image frame to a substantial intermediate portion of the Nth image frame, detecting a front edge of the Nth image frame and a back edge of the (N−1)th image frame, defining a difference between an edge position depending upon the maximum point of the first sensor and an edge position depending upon the maximum point of the second sensor at the front edge of the preceding Nth image frame already detected and a difference at the back edge the current Nth image frame detected at present, respectively, and comparing the respective differences to select any one edge having a lower difference.

According to the fifth aspect, the quantity of light received by the light receiving portion while the photographic film is carried from the intermediate position of the (N−1)th image frame to that of the Nth image frame. The detected quantities of received light are respectively different since the plurality of sensors has each different scanning line to the image frame. Namely, the quantity of received light is varied depending upon whether or not the image frame is underexposed or overexposed. Further, the quantity of received light is varied depending upon whether or not the image frame has a specific mark projecting from a general frame of the image frame. The maximum point of the sensor (the first sensor) disposed corresponding to the largest quantity of received light is defined. The maximum point of the sensor (the second sensor) disposed corresponding to the smallest quantity of received light is defined. The image frame edge is detected depending upon each maximum point. Therefore, a single image frame has two detected edges. The maximum point is disposed between the (N−1)th image frame and the Nth image frame. Accordingly, the back edge of the (N−1)th image frame and the front edge of the Nth image frame is detected. As a result, in a single carrying step, the four edges are detected in all.

The preceding Nth image frame is defined as the Nth image frame which has been already detected, and the current Nth image frame is defines as the Nth image frame which is detected at present. In the front edge of the preceding Nth image frame and the back edge of the current Nth image frame detected at present, each difference between the edge position depending upon the maximum point of the first sensor and the edge position depending upon the maximum point of the second sensor is defined. It can be determined that the detection can be made without adverse effect by overexposure, underexposure, or the specific mark of the image frame at an edge position having a lower difference. Therefore, one edge having a lower difference can be defined as a reference for positioning the Nth image frame. As a result, the image frame can be more accurately positioned at the predetermined position.

In the above fifth aspect, the selected edge has the two edges. In the two edges, the image frame edge determined depending upon the maximum point of the first sensor can be defined as the reference for positioning. That is to say, the edge is selected by using each difference as set forth hereinbefore. Accordingly, no erroneous detection occurs due to the specific mark at the maximum point of the first sensor on the selected edge. Hence, it is prohibited to detect the edge using the maximum point of the second sensor which is tend to vary due to an image pattern of the image frame. As a result, more accurate detection can be made for positioning.

Further, according to the fifth aspect, a temporary edge may be defined depending upon the maximum point. The minimum point may be defined within the range having a predetermined interval from the temporary edge. Thus, a middlemost point between the maximum point and the minimum point may be defined as the image frame edge. To define the image frame edge, it is general to obtain the distribution of transmission density of the photographic film. The photographic film is carried by a predetermined interval from the intermediate portion of the image frame to that of the adjacent image frame. The maximum point is defined within the range having the predetermined interval. A point having a transmission density value account for 90 to 95% of the maximum point is defined as the temporary edge of the image frame. If the image frame has a fine exposure condition, the temporary edge is identical with the actual image frame edge. If the image frame is underexposed or overexposed, the distribution of transmission density is varied so that the temporary edge is not accurately identical with the image frame edge. Thus, the minimum point within the range having the predetermined interval from the temporary edge is determined. A middlemost point between the maximum point and the minimum point may be defined as the image frame edge. Hence, the image frame edge can be detected without a large error even if the image frame is underexposed or overexposed.

Furthermore, according to the fifth aspect, when the image frame edge can not be detected, it is possible to carry the photographic film by a predetermined interval from a step position of the (N−1)th image frame to position the Nth image frame at the predetermined position. If the image frame has an extreme defect such as underexposure, overexposure, fog, Or unexposure, an image frame edge may not be detected. In this case, the Nth image frame film is carried by a predetermined interval from a stop position of the (N−1)th image frame for positioning. The carrying control allows to prohibit a rapid interruption of the process, and results in improvement of the operation efficiency, especially, in the fully automatic mode. Further, it may be employed to store the image frame number positioned by carrying by the predetermined interval, and to display the number during operator's check.

BRIEF DESCRIPTION OF THE DRAWINGS

FIG. 17 is a characteristic diagram showing a second embodiment of an image frame having a frame mark and a distribution of transmission density of the image frame.

DESCRIPTION OF THE PREFERRED EMBODIMENTS

Figure 1:
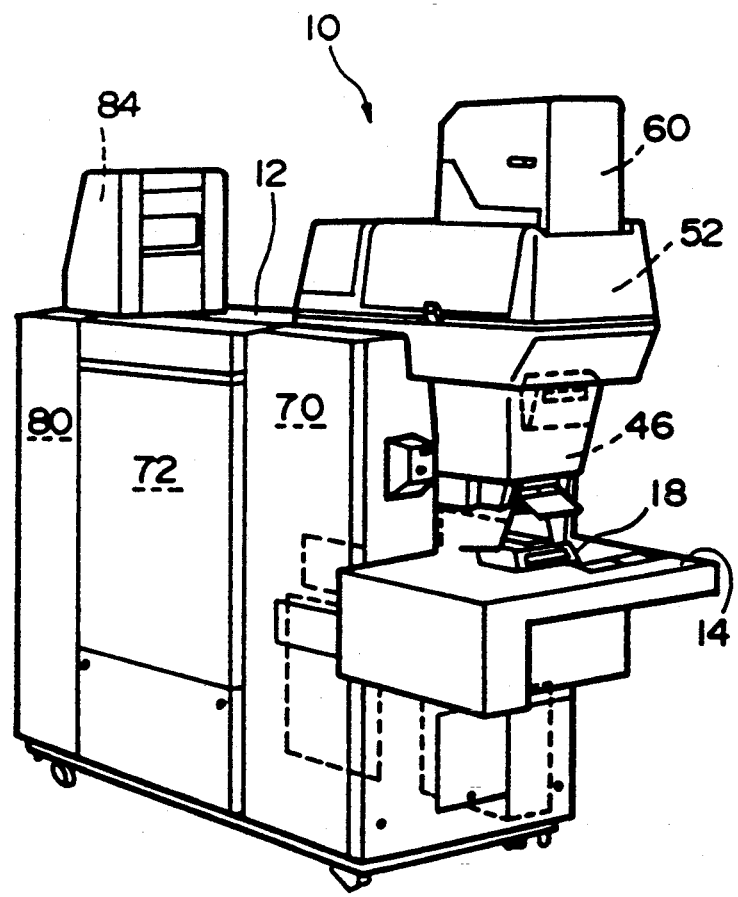
FIG. 1 is a perspective view illustrating an external construction of a printer-processor.
Figure 2:
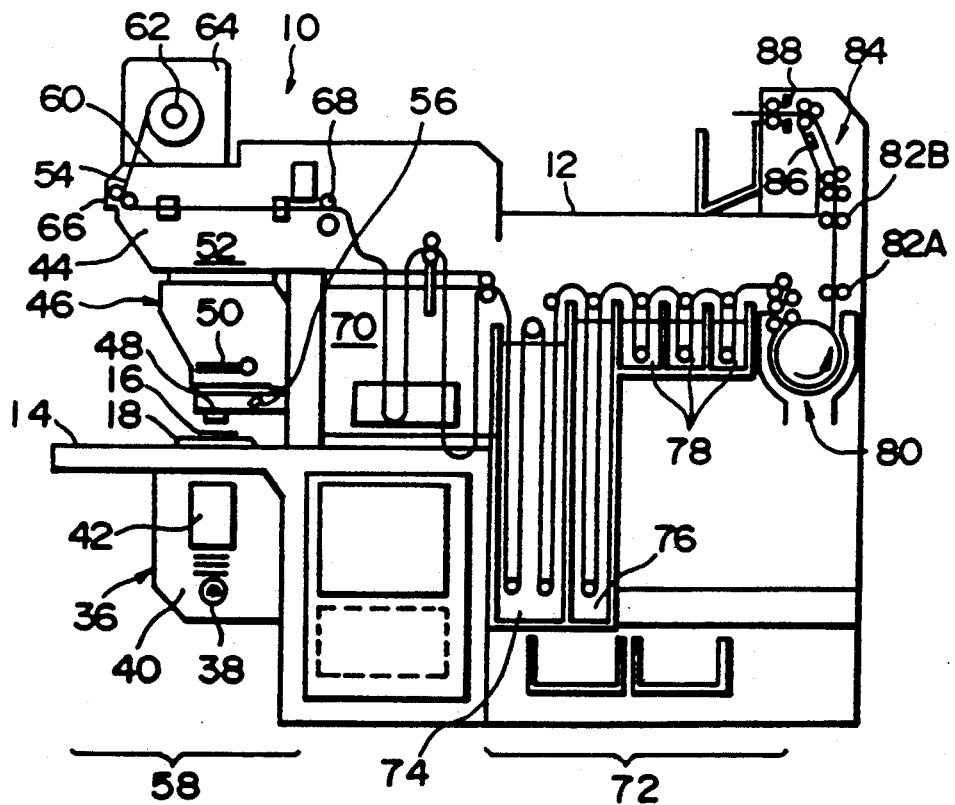
FIG. 2 is a schematic diagram illustrating an internal construction of the printer-processor.

FIGS. 1 and 2 illustrate a printer-processor 10 serving as a photoprinter, to which a method and a control unit, and a photographic film carrier according to the present invention are applied. Referring now to the accompanying drawings, overall construction of the printer processor 10 will be described.

The printer-processor 10 is externally covered with a casing 12.

The printer-processor 10 is provided with a working table 14 projecting from the casing 12 to the left-hand in FIG. 2. A negative carrier 18 in which a negative film 16 is set is mounted on the upper surface of the working table 14. A detailed construction of the negative carrier 18 will be discussed in the following.

A light source portion 36 is under the working table 14. The light source portion 36 has a light source 38. Light emitted from the light source 38 passes through a filter portion 40 and diffusion cylinder 42, and reaches the negative film 16 set on the negative carrier 18. The filter portion 40 comprises three filters C, M, and Y. Each filter is adapted to move into or out of an optical axis of the light.

An optical system 46 is mounted on an arm 44 projecting from the printer-processor 10. The optical system 46 comprises a lens 48 and a shutter 50, and is disposed across the optical axis of the light. The light transmitted through the negative film 16 passes through the lens 48 and the shutter 50 to direct an image of the negative film 16 on a photographic paper 54 set in an exposure chamber 52.

Further, the optical system 46 is provided with a densitometer 56 such as CCD for measuring a density of the negative film 16. The densitometer 56 is connected to a controller 162. An exposure compensation during exposure is set according to data measured by the densitometer 56 and keyed data by an operator.

An exposure portion 58 comprises the light source portion 36, the optical system 46, and the exposure chamber 52, to perform a printing process.

A mounting portion 60 is provided on the upper side of the arm 44. Mounted detachably on the mounting portion 60 is a paper magazine 64 containing a photographic paper 54 wound around a reel 62 in a layer fashion.

A pair of rollers 66 are disposed in the vicinity of the mounting portion 60 to hold the photographic paper 54 therebetween to carry to the exposure chamber 52. Also, a pair of rollers 68 are disposed in the vicinity of the exposure chamber 52. Similarly, the rollers 68 hold the photographic paper 54 on which an image of the negative film 16 is recorded, in the exposure chamber 52 to carry to a reservoir portion 70 adjacent to the exposure chamber 52.

The reservoir portion 70 has the printed, or exposed, photographic paper 54 in store to cancel difference in operating time between the exposure portion 58 and a processor portion 72. The exposure portion 58 performs a printing process while a processor portion 72 performs a developing, a fixation, and a washing in water.

The photographic paper 54 ejected from the reservoir portion 70 is carried to a color development portion 74 of the processor portion 72 adjacent to the reservoir portion 70. The photographic paper 54 is immersed in developer for development in the color development portion 74. The developed photographic paper 54 is carried to a bleach-fix portion 76 adjacent to the color development portion 74. The photographic paper 54 is immersed in fixer for fixation in the bleach-fix portion 76. The fixed photographic paper 54 is carried to a rinse portion 78 adjacent to the bleach-fix portion 76. The photographic paper 54 is immersed in washing water in the rinse portion 78 for washing in water.

The washed photographic paper 54 is carried to a drying portion 80 adjacent to the rinse portion 78. The drying portion 80 winds the photographic paper 54 around a roller to expose to hot-air for drying.

A pair of rollers 82A hold the photographic paper 54 therebetween, and ejects the dried photographic paper 54 from the drying portion 80 at regular velocity. A pair of rollers 82B are disposed on the upper side of the rollers 82A. The rollers 82B intermittently rotates corresponding to operation of a cutter portion 84 which is disposed downstream the drying portion 80. The cutter portion 84 comprises a cut mark sensor 86 for detecting a cut mark provided for the photographic paper 54, and a cutter 88 for cutting the photographic paper 54. The cutter portion 84 cuts the photographic paper 54 at every image frame, and ejects the image frames outside the casing 12 of the printer-processor 10.

Figure 3:
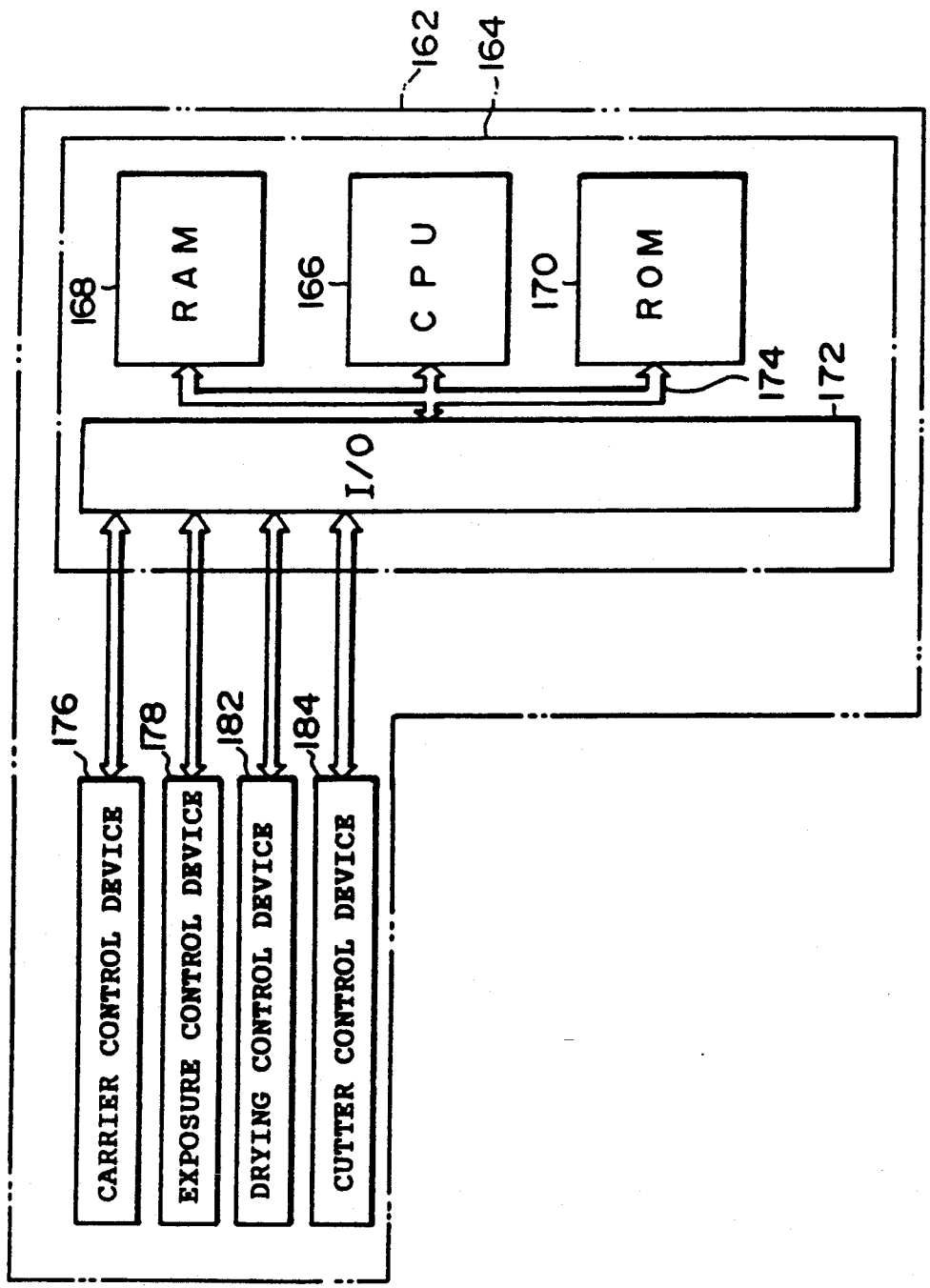
FIG. 3 is a block diagram of a controller of the printer-processor.

As shown in FIG. 3, each control in the devices described later is performed by the controller 162. The controller 162 includes a microcomputer 164. The microcomputer 164 comprises CPU 166, RAM 168, ROM 170, an input-output port 172, and a bus 174 such as a data bus or a control bus. The CPU 166, the RAM 168, the ROM 170 and the input-output port 172 are connected by the bus 174.

The controller 162 is connected with a carrier control device 176 which controls a carrying system for the negative film 16 and photographic paper 54 in the printer-processor 10. The controller 162 is connected with an exposure control device 178. The exposure control device 178 controls an exposure system which serves to, for example, turn on the light source 38, move the respective filters of the filter portion 40 in and out of the optical axis, feed a frame in the negative carrier 18, and open and close the shutter 50 in the exposure portion 58. The controller 162 is connected with a drying control device 182 which controls driving conditions for a fan and a heater in the drying portion 80. Further, the controller 162 is connected with a cutter control device 184 which controls to detect the cut mark by the cut mark sensor 86 of the cutter portion 84 downstream the drying portion 80, and cut the photographic paper 54 by the cutter 88.

Figure 4:
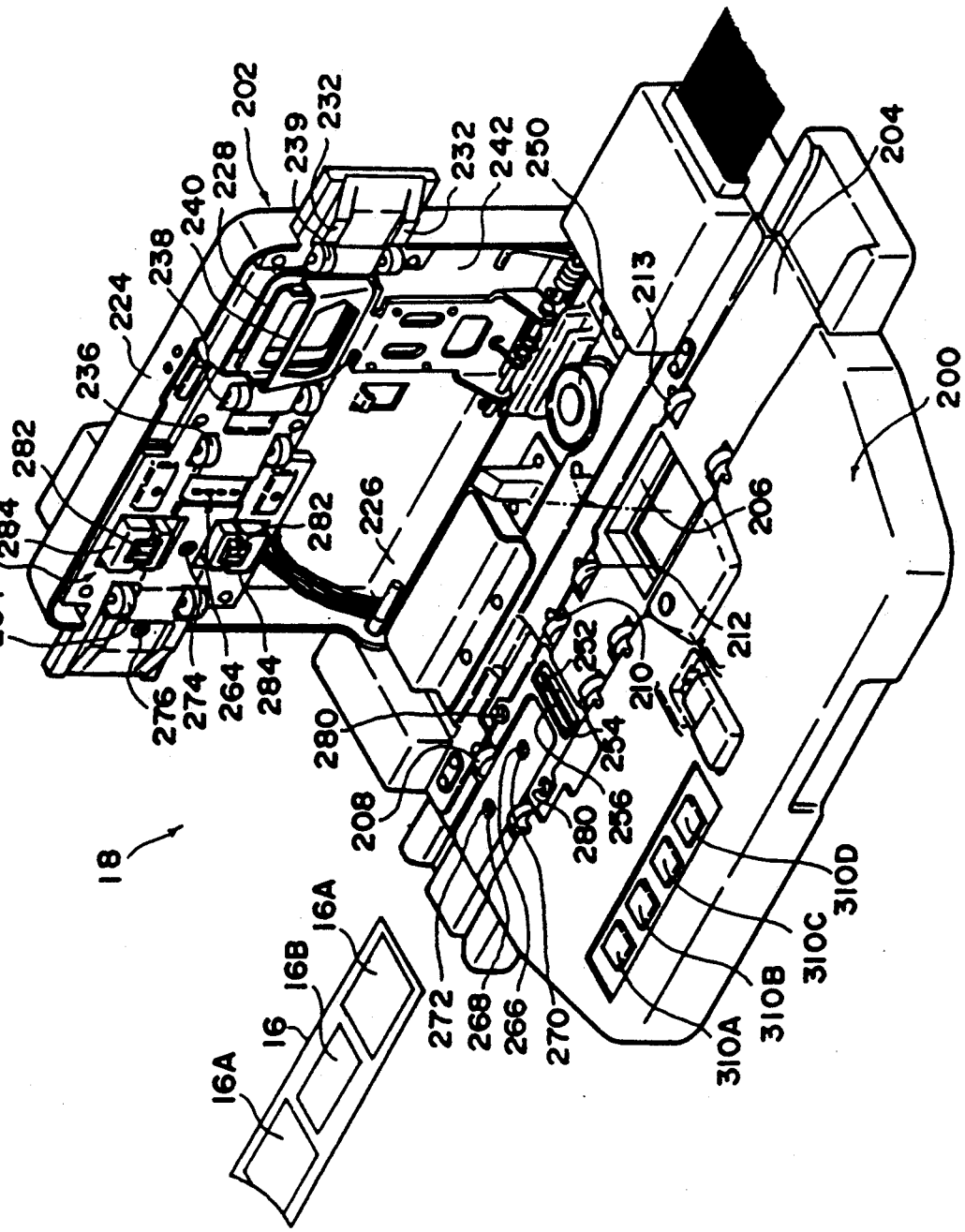
FIG. 4 is a perspective view illustrating an external construction of a negative carrier.

FIG. 4 illustrates a preferred embodiment of the negative carrier 18 according to the invention. The negative carrier 18 essentially comprises a pedestal 200 serving as a base, and an opening/closing cover 202 serving as a cover body.

The pedestal 200 has a negative film carrying path 204 serving as a guide path. The negative film carrying path 204 is provided with a printing opening 206 at a longitudinal intermediate portion thereof. The printing opening 206 serves as an exposure opening for light emitted from the light source 38 which is provided for the printer-processor 10.

Figure 5:
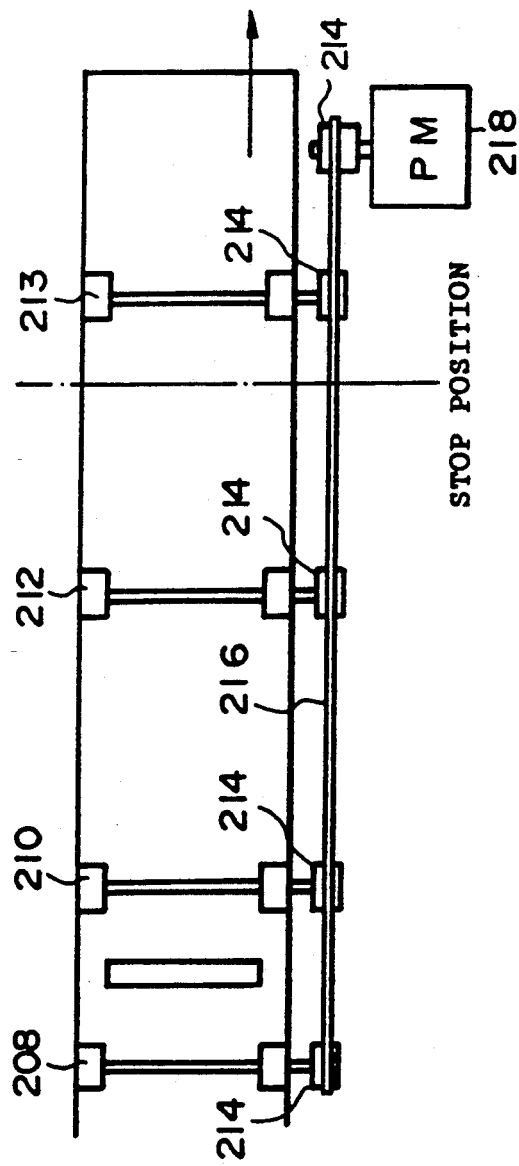
FIG. 5 is a perspective view illustrating a carrier system of the negative carrier.

The printing opening 206 has the same size as a full-size image frame 16A of the negative film 16. In the negative film carrying path 204, carrying rollers 208, 210, 212, 213 are disposed between the upstream side of the printing opening 206 (on the left-hand side in FIG. 4) and the downstream side thereof (on the right-hand side in FIG. 4) corresponding to the back surface (underside) of the negative film 16. As shown in FIG. 5, the respective rollers 208, 210, 212, and 213 are provided with sprockets 214 at one of the axial ends of the respective roller axes. The respective rollers are engaged with a teeth portion formed on an endless timing belt 216.

The timing belt 216 is wound around the sprocket 214 provided for the carrying roller 208 which is positioned at the most upstream side, and wound around the sprocket 214 which is provided for a rotation axis of a pulse motor 218. The pulse motor 218 is connected through a driver 222 to a control unit 220 (see FIG. 10), and is driven step-by-step in response to a driving signal from the control unit 220. Thus, when the pulse motor 218 rotates, the respective carrying rollers 208, 210, 212, and 213 are driven to rotate in the same rotating direction at the same rotating velocity.

In the opening/closing cover 202, one side edge of a case-like cover body 224 is pivotally supported by a bar 226 secured to the pedestal 200. The opening/closing cover 202 can be opened and closed pivotally on the bar 226 with respect to the pedestal 200.

A through-hole 228 corresponding to the printing opening 206 is provided in a bottom of the cover body 224. In addition, the cover body 224 is provided with an upper guide base 230 at a position corresponding to the negative film carrying path 204 in a closed condition. Negative film guide walls 232 are integrally mounted with the upper guide base 230 to form a interval between the negative film guide walls 232 and the negative film carrying path 204. The interval has a slightly lager dimension than a thickness of the negative film 16 to ensure the carrying path for the respective transverse edges of the negative film.

Idle rollers 234, 236, 238, and 239 are disposed corresponding to the carrying rollers 208, 210, 212, and 213 between the respective guide walls 232. When the opening/closing cover 202 is closed, the negative film 16 is held between the idle rollers 234, 236, 238, and 239 and the carrying rollers 208, 210, 212, and 213. Carrying force can be transmitted from the respective rollers to the negative film 16.

Disposed on the upper guide base 230 is an upper mask 240 at the intermediate portion thereof in the negative film carrying direction. The upper mask 240 can relatively move with respect to the upper guide base 230, and has an opening at a position corresponding to the through-hole 228. The upper mask 240 is removably provided for a mask base 242. In this embodiment, two types of the upper masks 240 are used, one having a full-size opening, and the other having a panoramic opening. These upper masks 240 can be selectively exchanged according to the size of image frames (see FIG. 6) which is recorded on the negative film 16.

Figure 7:
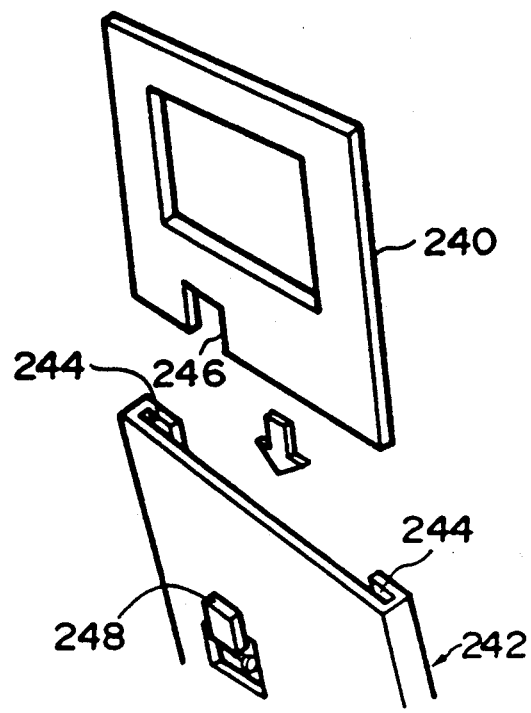
FIG. 7 is a perspective view of a mask base.

As shown in FIG. 7, a mask base 242 has the respective transverse edge portions which are opposed with each other and bent to form substantially channel section, thereby forming a rail portion 244. The upper mask 240 is inserted into the rail portion 244 so that the upper mask 240 is supported by the mask base 242. A type of the upper mask 240 (for example, with the full-size opening) has a notch 246 at the pointed edge on the entrance side of the upper mask 240. At a position corresponding to the notch 246, a limit switch 248 is mounted on the rail portion 244.

A signal line extending from the limit switch 248 is connected to the control unit 220. Consequently, only when the upper mask 240 with the panoramic size opening is inserted, a contact point to contact the limit switch 248 with the upper mask 240 is switched. Thus, it is possible to discriminate the type of the inserted upper mask depending on ON/OFF condition of the limit switch 248.

The mask base 242 is pivotally supported about a pivoting axis in the vicinity of the pivoting axis of the cover body 224 to correspond to a solenoid body 250 mounted on the pedestal 200 with the cover body 224 closed. When the solenoid body 250 is energized, the mask base 242 is attracted by magnet power to the solenoid 250. Accordingly, the upper mask 240 can be tightly contacted with the printing opening 206 of the negative film carrying path 204. Further, the negative film 16 is positioned with respect to the optical axis P, and can be held between the upper mask 240 and the printing opening 206.

Figure 8:
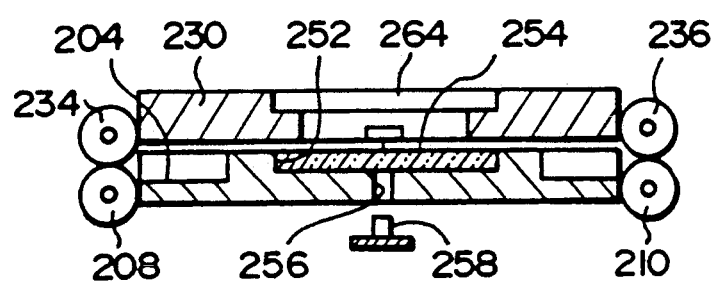
FIG. 8 is a side sectional view of a guide path for the negative carrier.

As shown in FIG. 8, a rectangular groove 252 is provided at a position upstream the printing opening 206 on the bottom surface of the negative film carrying path 204. A transparent glass plate 254 is fitted into the groove 252 to form a coplanar surface with respect to a peripheral guide surface. A slit hole 256 passing through the negative film carrying path 204 is provided in the bottom of the groove 252. The longitudinal sides of the slit hole 256 are disposed along the transverse direction of the negative film carrying path 204. Corresponding to the slit hole 256, a plurality of light emitting diodes (hereinafter referred as LED chips) serving as light emitting portions are disposed on the back surface of the negative film carrying path 204 in the transverse direction of the negative film carrying path 204, i.e., along the transverse direction of the negative film carrying path 204.

Figure 9:
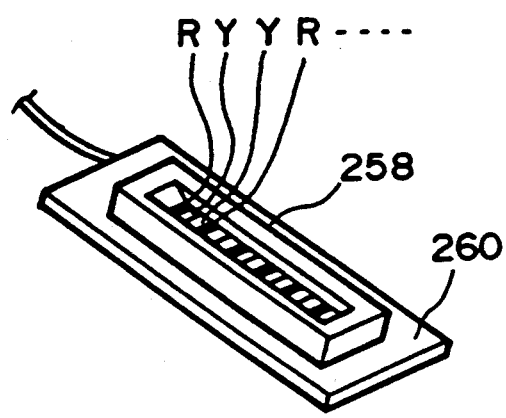
FIG. 9 is a perspective view of a LED chip.

As shown in FIG. 9, two-color LED chips 258 emitting R (red light) and Y (yellow light) are arranged on the substrate 260. These chips are arranged in the order of RYYRYYRYY . . . , starting with left-hand side in FIG. 9. Therefore, a ratio of R to Y is 1:2, and luminous efficiencies of the respective colors are identical with each other.

The respective LED chips 258 are connected through a shared signal line 262 to the control unit 220. Lights are emitted from the chips 258 in response to a signal output from the control unit 220, and are transmitted through the negative film 16 carried along the negative film carrying path 204.

Figure 6:
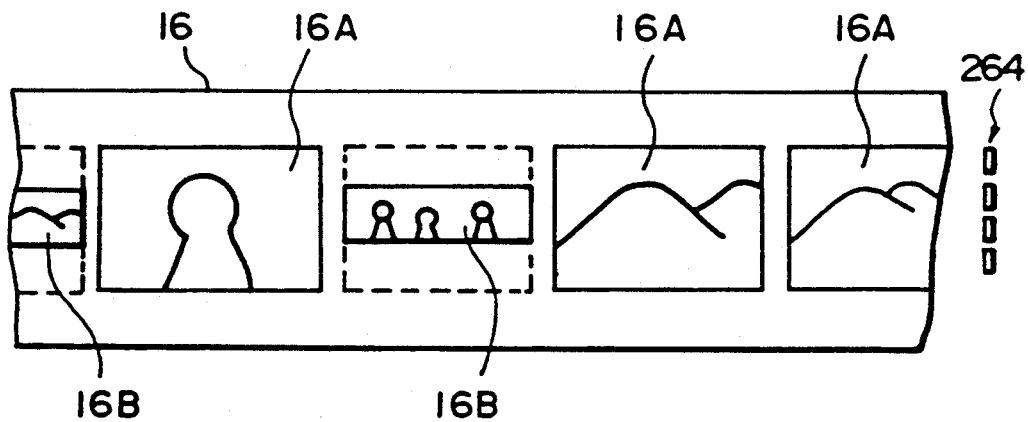
FIG. 6 is a plan view illustrating a size of each image frames recorded on a negative film.

The slit hole 256 is opposed to four image detecting plane sensors 264 provided in the upper guide base 230 of the cover body 224 with the cover body 224 closed. Consequently, the image detecting sensors 264 detect transmission exposure of the light transmitted through the negative film 16. As shown in FIG. 6, the four image detecting sensors 264 are disposed along the transverse direction of the negative film 16, and connected to the control unit 220 through each independent signal line. The control unit 220 obtains a distribution of the transmission density of the photographic film based on output signals from the image detecting sensors 264. Thus, the control unit 220 can detect a boundary between the image frame 16A and the base portion, i.e., an image frame edge.

As shown in FIG. 6, the image detecting sensors 264 are arranged within the range of longitudinal dimension of the full-size image frame 16A (in the transverse direction of the negative film 16). Further, two of those on the intermediate side of the negative film 16 are arranged within the range of longitudinal dimension of the panoramic size image frame 16B having a panoramic image plane, while the rest of those are arranged outside the range of longitudinal dimension of the panoramic size image frame 16B. Accordingly, if two of the image detecting sensors 264 at the respective ends of the image detecting sensors 264 detect values having the base density of the negative film 16, it can be determined that the detected image frame is the panoramic size image frame 16B.

The bottom surface of the negative carrying path 204 is slightly deepened at the transverse intermediate portion thereof further upstream the slit hole 256. Consequently, the bottom surface never contacts with the negative film 16 during carrying the negative film 16. Namely, since the bottom surface contacts only with the respective transverse edge portions of the negative film 16, the image frame face of the negative film 16 can avoid damage. The deepened bottom surface is longitudinally provided with two circular holes 266, 268 in the transverse intermediate portion of the negative film carrying path 204. LED elements 270, 272 are buried in the circular holes 266, 268. The LED elements 270, 272 are connected to the control unit 220, respectively, and are adapted to emit in response to a signal from the control unit 220.

The LED element 270 nearer to the slit hole 256 serves to detect a splice tape or managing tape. The splice tape is applied to unite a plurality of the negative films 16 to form a roll. The managing tape is attached on the respective negative films 16. On the other hand, in the negative film carrying path 204, the LED element 272 provided on the entrance side of the negative film serves to detect presence or absence of the negative film 16. The LED elements 270, 272 are arranged corresponding to a tape sensor 274 and the negative film presence or absence sensor 276 which are mounted on the upper guide base 230, respectively. The tape sensor 274 and the negative film presence or absence sensor 276 are connected to the control unit 220, respectively.

LED elements 280 are buried in the respective transverse ends of the negative film carrying path 204 between the LED elements 270 and 272. The LED elements 280 are connected to the control unit 220, and are provided corresponding to bar code sensors 282 which are mounted at the respective transverse ends of the upper guide base 230. The bar code sensors 282 are connected to the control unit 220. Bar codes provided for the negative film 16 are transmitted by the light emitted from the LED elements 280, and are detected by the bar code sensors 282. In such a way, the bar code can be decoded in the control unit 220.

Figure 11:
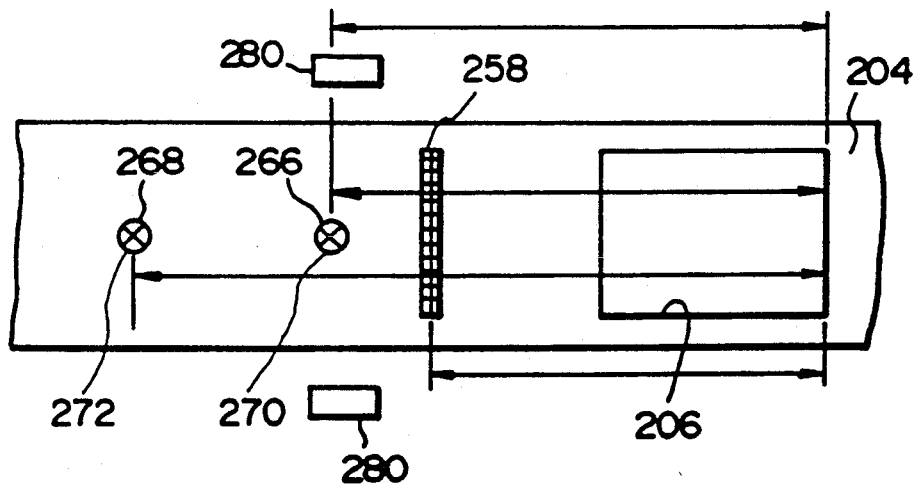
FIG. 11 is a plan view illustrating a position and relationship between a printing opening and sensor position.

The bar code sensors 282 are mounted on frame members 284 which are rockably provided with respect to the upper guide base 230. The bar code sensors 282 are adapted to track the negative film 16 which is meanderingly carried. Accordingly, for all the meandering negative film 16, the bar code sensors 282 can read the bar code provided for a narrow portion at the transverse end of the negative film 16. As shown in FIG. 11, the positions of the respective sensors are determined on the basis of a reference side of the printing opening 206.

Figure 10:
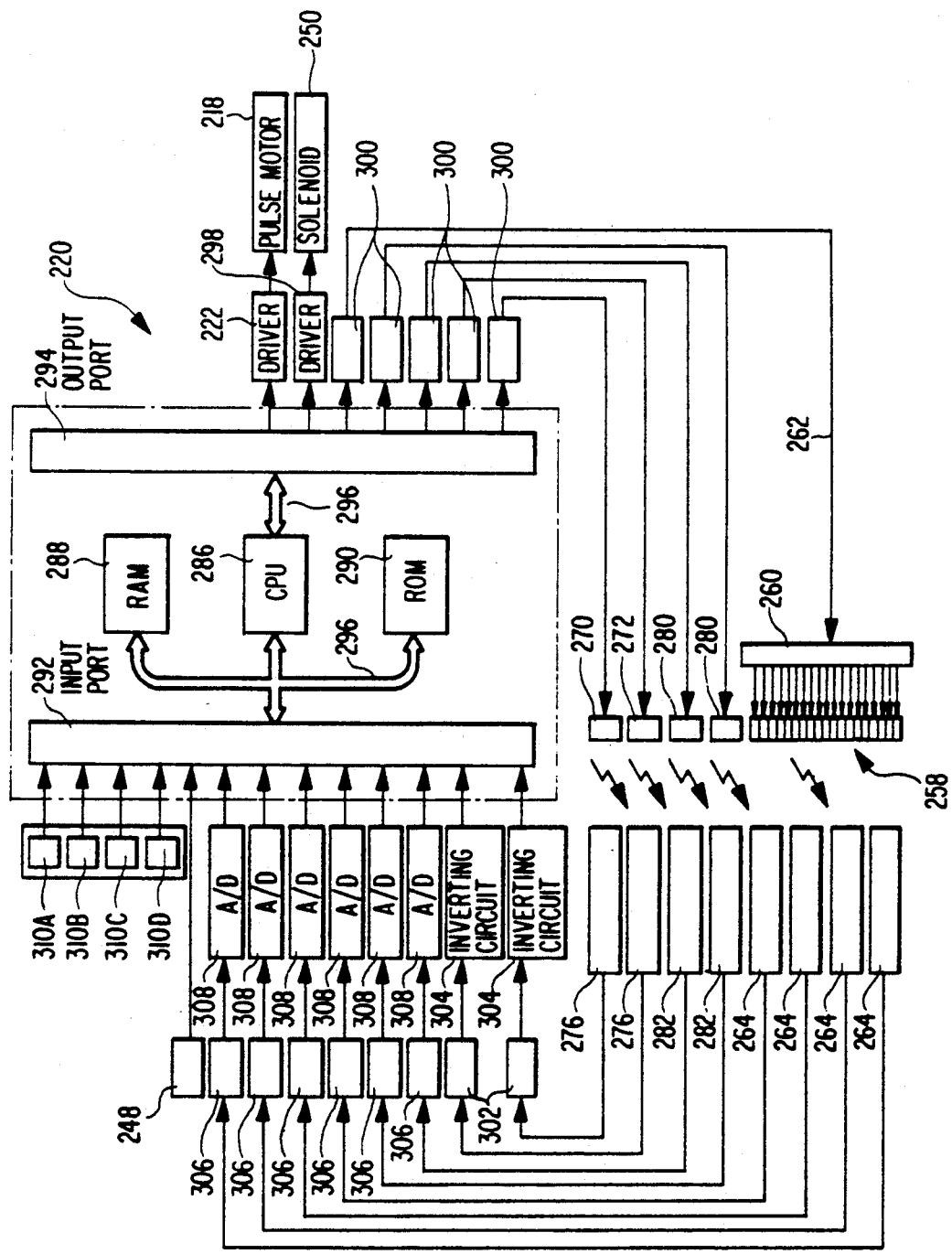
FIG. 10 is a block diagram of a control unit of the negative carrier.

As shown in FIG. 10, the control unit 220 comprises CPU 286, RAM 288, ROM 290, input port 292, output port 294, and bus 296. The input port 294 is connected through the driver 222 to a pulse motor 218, and through a driver 298 to the solenoid body 250, respectively.

On the other hand, the output port 294 is connected through LED driver 300 to the LED elements 270, 272, 280, and to the substrate 260 of the LED chip 258.

The input port 292 is connected to the tape sensors 274 and the negative film presence or absence sensors 276 through comparators 302 and inverted circuits 304. Further, the input port 292 is connected through amplifiers 306 and A/D converters 308 to two bar code sensors 282 and four image detecting sensors 264. Moreover, the input port 292 is connected to four key switches 310A, 310B, 310C, and 310D which are mounted on the pedestal 200 of the negative carrier 18. Operation of these key switches allows to feed forward, feed backward, and finely adjust the stop position of the negative film 16.

The control unit 220 is connected with the controller 162 in the side of the printer-processor 10. The control unit 220 communicates with the controller 162 in the following cases, i.e., where the image frame has been positioned, where the next image frame should be operated for positioning after completion of the printing process of the image frame, and where an abnormality occurs in the negative film carrying system or the image plane detection in the negative carrier 18. If such an abnormality occurs, an alarm (not shown) mounted on the printer-processor 10 is adapted to signal the abnormality, and to interrupt the process. However, the output of the abnormality signal can be limited according to each mode since the negative carrier 18 is controlled in each mode, i.e., a manual mode, an automatic mode, or a fully automatic mode.

In the manual mode, it is not necessary to alert the operator to the abnormality except for a few cases since the operator monitors the apparatus. In the fully automatic mode, it is undesirable for operation efficiency to signal every abnormality to interrupt the process. For example, when one image frame is overexposed, an optimal print of the image frame can not be expected in the fully automatic mode. However, reprinting of the image frame after a series of operations is more efficient in comparison with operating the printing process switched to the manual mode for each abnormality. Therefore, in the embodiment, output condition of the abnormality signal is varied according to the operation mode (manual mode, automatic mode, and fully automatic mode) of the printer-processor 10 on which the negative carrier 18 is mounted.

Table 1 shows whether or not the abnormality signal should be output according to the respective abnormality contents, or causes, in each control mode. A mark ○ in the control mode column refers to presence of output of the abnormality signal while a mark X refers to absence of output of the abnormality signal.

TABLE 1

| Code | Abbr. | Results of Detection | Alarm Level A | B | C | Content |
|---|---|---|---|---|---|---|
| 0 | OK | NORMAL | | | | Frame is normally detected. |
| 1 | SU | UNDEREXPOSURE | ○ | X | X | Frame has undetectable right and left edges. |
| 2 | SO | OVEREXPOSURE | ○ | X | X | Frames have an undetactable edge due to bleeding. |

TABLE 1-continued

| Code | Abbr. | Results of Detection | Alarm Level A | B | C | Content |
|---|---|---|---|---|---|---|
| 3 | FI | FAULTY INTERVAL | ○ | X | X | Interval between frames is irregular. |
| 4 | FL | FRAME SIZE ABNORMALITY | ○ | X | X | Frame has an irregular frame size. |
| 5 |  | FRAME OVERLAP | ○ | X | X | Frames have an overlap region not more than 5 mm. |
| 6 | KB | PARTIAL FOG | ○ | X | X | Frame has a fog at back end thereof. |
| 7 | SN | PARTIALLY UNEXPOSED NEGA | ○ | X | X | Frame is partially unexposed. |
| 8 | F/H | NEGA SIZE ABNORMALITY | ○ | ○ | ○ | Mask is not identical with image in size. |
| 9 | TOP | LEADING EDGE ABNORMALITY | ○ | X | X | Top frame is undetectable. |
| 10 | SNN | UNEXPOSED NEGA | ○ | X | ○ | Entire negative film is unexposed. |
| 11 | KBR | FOGGY NEGA | ○ | X | ○ | Entire negative film is foggy. |
| 12 | NEE | NEGA END ABNORMALITY | ○ | ○ | ○ | Negative film is carried with jammed, meandered or the like. |
| 13 |  |  |  |  |  |  |
| 14 |  |  |  |  |  |  |
| 15 |  | OTHER ABNORMALITIES | ○ | X | ○ | Frame can not be accurately positioned by the other causes. |

A ... Automatic Control, B ... Fully Automatic Control, C ... Manual Control

ROM 290 has a stored program to, for example, compensate a mounting position of each sensor and compensate a deviation of a value detected by each sensor. The program is set as a correction coefficient before shipment of the negative carrier 18. To compensate the mounting position, a distance between the reference side of the printing opening 206 and each sensor is measured by the pulse number of the pulse motor 218, and an error between the measured pulse number and the preset pulse number is corrected. A correction coefficient is set for each image detecting sensor 264 to compensate a deviation of each sensor. Especially, each correction coefficient is set for each sensor 264 such that the four image detecting sensors 264 can detect the same quantity of light from the respective LED chips 258.

Each quantity of light emitted from LED elements and LED chips corresponding to the respective sensors 264, 282, is set to be suitable for the range of each A/D converter 308 for converting analog values detected by the image detecting sensors 264 and the bar code sensors 282 to digital values, before shipment of the negative carrier 18.

RAM 288 has a stored map for setting a transmission density of the negative film on the basis of data detected by the image detecting sensor 264. Therefore, it is possible to obtain a distribution of transmission density in one carrying step by the pulse motor 218 (in the embodiment, the interval between the center of the image frame 16A or 16B and that of the adjacent image frame is defined as one carrying step). The image frame edge is determined based on the distribution of transmission density, and stored corresponding to the feed pulse number of the pulse motor 218.

A description will be given of the operation of the embodiment hereinafter.

First, a normal printing procedure will be described in the following.

When the printing process is started, the light source 38 is turned on and the negative carrier 18 is driven to position the negative film 16. LATD (large area transmittance density) of the negative film 16 is measured by the densitometer 56. The measured data and the manual input data allow to set the exposure correction and calculate an exposure (exposure time). As a result, an optimal print condition can be provided.

Meanwhile, the negative films 16 may have a full-size image frames of a full-size type 16A as well as image frame of a panoramic size type 16B in the same film. Printing processes for the respective size types differ in mask area for negative film, printing magnification, mask area for photographic paper, carrying interval of photographic paper. Therefore, after printing one of both the size types while passing the other, it is efficient to print the other consecutively. Accordingly, in the embodiment, the print condition is set according to the type of the upper mask 240 which has been loaded in the mask base 242. Since the mask base 242 is loaded with the upper mask 240, the type of the upper mask 240 can be discriminated depending on the ON/OFF condition of the limit switch 248. Thus, the printing process is controlled to position only the image frame corresponding to the mask type detected by the limit switch 248, and pass the other type of the image frame.

Figure 16:
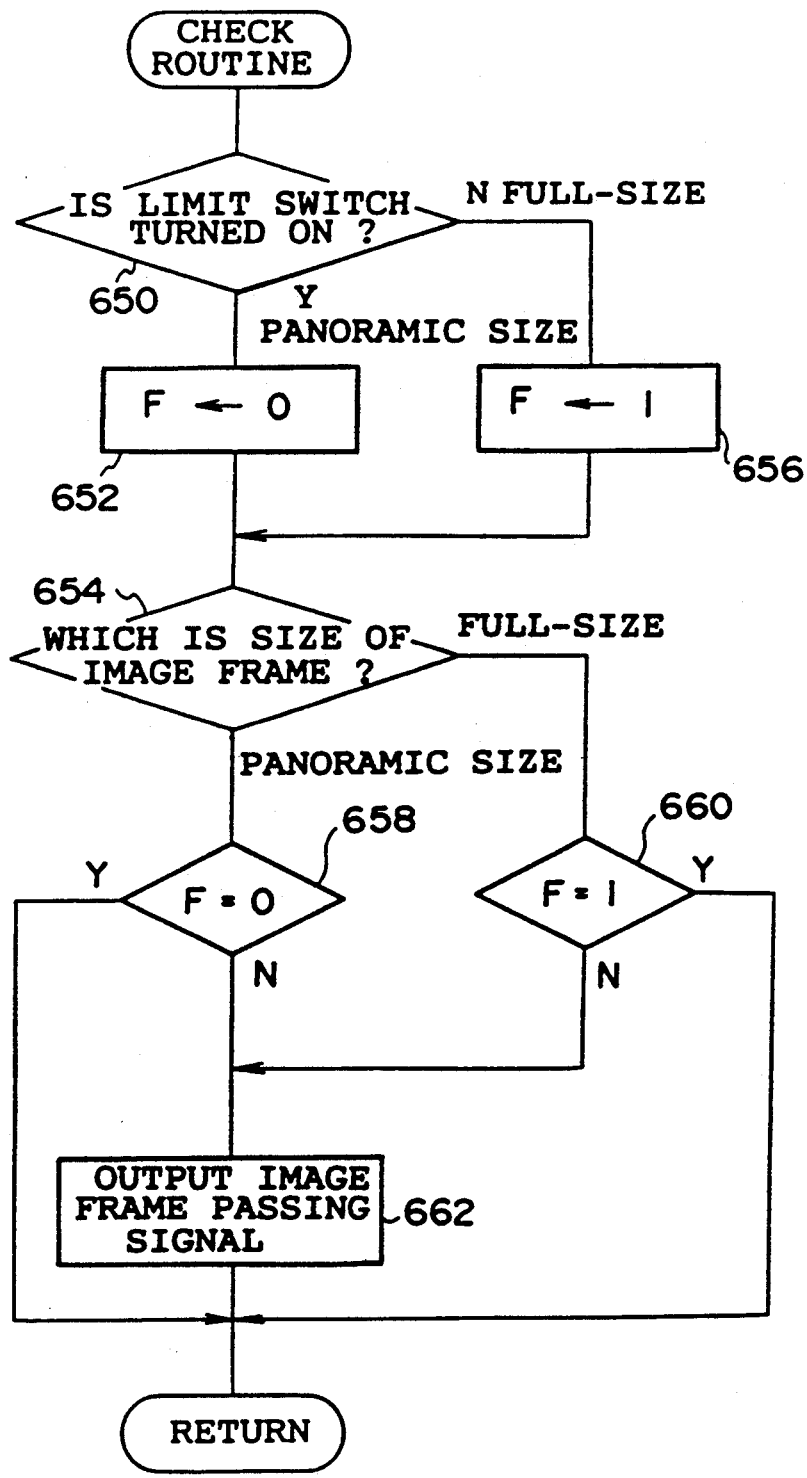
FIG. 16 is a flowchart showing a check routine for checking an image frame with an upper mask.

Referring now to FIG. 16, a description will be given of a check routine for checking the image frame with the upper mask.

In Step 650, it is determined whether or not the limit switch 248 is turned on. If turned on, it is determined that a panoramic size upper mask 242 has been loaded. The operation proceeds to Step 652 where the flag F is reset (set to zero), and the operation proceeds to Step 654. In Step 652, if not turned on, it is determined that a full-size upper mask 242 has been loaded. The operation proceeds to Step 656 where the flag F is set to 1, and the operation proceeds to 654.

In Step 654, the image frame size is determined. Namely, in the four image detecting sensors 264 of the negative carrier 18, two outermost sensors of those are arranged outside the range of longitudinal length of the panoramic size image frame 16B in conjunction with arranged inside the range of longitudinal length of the full-size image frame 16A. Therefore, when the two outermost image detecting sensors 264 detect a base density of the negative film 16, the image frame can be defined as the panoramic size image frame 16B. If detect an image density, the image frame can be defined as the full-size image frame 16A.

If defined as the panoramic size image frame 16B in Step 654, the operation proceeds to Step 658. If defined as the full-size image frame 16A, the operation proceeds to Step 660.

In Step 658, it is determined whether or not the flag F is reset. If not reset, it is determined that the image frame size is not identical with the upper mask size. The operation proceeds to Step 662 where a signal for skipping the image frame is output to a controller 162, and the operation proceeds to return. If reset in Step 658, it is determined that the image frame size is identical with the upper mask size. Accordingly, it is possible to perform the printing process so that the operation proceeds to return.

On the other hand, in Step 660, it is determined whether or not the flag F is set. If not set, it is determined that the image frame size is not identical with the upper mask size. The operation proceeds to Step 662 where a signal for skipping the image frame is output the controller 162, and the operation proceeds to return. If set in Step 660, it is determined that the image frame size is identical with the upper mask size. Accordingly, it is possible to perform the printing process so that the operation proceeds to return.

As discussed hereinbefore, for example, when the full-size upper mask 240 is loaded and the image detecting sensor 264 detects the panoramic size image frame 16B, the image frame is skipped. Thereafter, the next image frame 16A is positioned at the printing position. As a result, the printing process can be performed under the same condition so that the printing process efficiency can be improved.

Next, the photographic paper 54 is carried to the exposure chamber 52 to be positioned, thereafter the shutter 50 is opened. The opened shutter 50 allows light emitted from the light source 38 to pass through the filter portion 40 and the negative film 16 to the exposure chamber 52. When the printing process is started to print the image frame of the negative film 16 on the photographic paper 54 positioned in the exposure chamber 52, the respective filters C, M, and Y positioned on the optical axis are moved according to the exposure condition. The shutter 50 is closed after the predetermined exposure time. In the operation set forth hereinbefore, one image frame of the negative film 16 has been completely printed. The above operation is repeated to move the photographic paper 54 so as to carry printed parts thereof to the reservoir portion 70 in order.

The photographic paper 54 carried to the reservoir portion 70 is further carried to the color development portion 74 wherein the photographic paper 54 is immersed in developer for development. The developed photographic paper 54 is carried to a bleach-fix portion 76 for fixing. The fixed photographic paper 54 is carried to the rinse portion 78 to be washed in water. The photographic paper 54 washed in water is carried to the drying portion 80 for a drying process.

In the dried photographic paper 54, a cut mark is detected in the cutter portion 84 so that the photographic paper 54 is cut for each image frame.

In the printer-processor 10, positioning of the image frame can be effected in the manual control mode as well as in the automatic control mode. In addition, in the so-called automatic control mode, the operator monitors the negative carrier 18 at least to operate the print start button. On the other hand, in the so-called fully-automatic control mode, all the operations including the print start step are effected in response to a signal communication between the control unit 220 of the negative carrier 18 and the controller 162 of the printer-processor 10. Thus, the printer-processor 10 is switchable in three control stages (the manual control, the automatic control, and the fully automatic control).

In the embodiment, the output of the abnormality signal from the negative carrier 18 is limited according to each control mode to prohibit an unnecessary alarm provided in spite of the monitoring operator.

Namely, as shown in Table 1, in the manual control mode, the abnormality signal is output only in the cases of Negative Size Abnormality (Code 8), Unexposed Negative Film (Code 10), Foggy Negative Film (Code 11), Negative Film End Abnormality (Code 12), and Other Abnormalities (Code 15).

In the fully automatic control mode, the abnormality signal is output except for the case that there is an only abnormality on a finished condition and the printing process can be smoothly performed. Namely, the abnormality signal is output in the cases of Faulty Interval (Code 3), Frame Size Abnormality (Code 4), Negative Size Abnormality (Code 8), Leading Edge Abnormality (Code 9), Unexposed Negative Film (Code 10), Foggy Negative Film (Code 11), and Negative Film End Abnormality (Code 12).

In the automatic control mode, the abnormality signal is output for each abnormality.

In such a way, the abnormality signal is output according to each control mode to prohibit an unnecessary alarm provided in spite of the monitoring operator. Accordingly, the fully automatic control mode can be utilized with advantage.

Further, it is possible to avoid interrupting the operation of the printer-processor per se for each unnecessary abnormality signal, and eliminate action for each abnormality. As a result, the printing operation efficiency can be improved.

In the embodiment, the negative carrier 18 automatically controls to position each image frame 16A (16B) of the negative film 16 at the printing position (in the fully automatic control mode). Each image frame edge is detected by the image detecting sensors 264. The negative carrier 18 controls to carry the image frame edge corresponding to the feed pulse number of the pulse motor 218.

Figure 12:
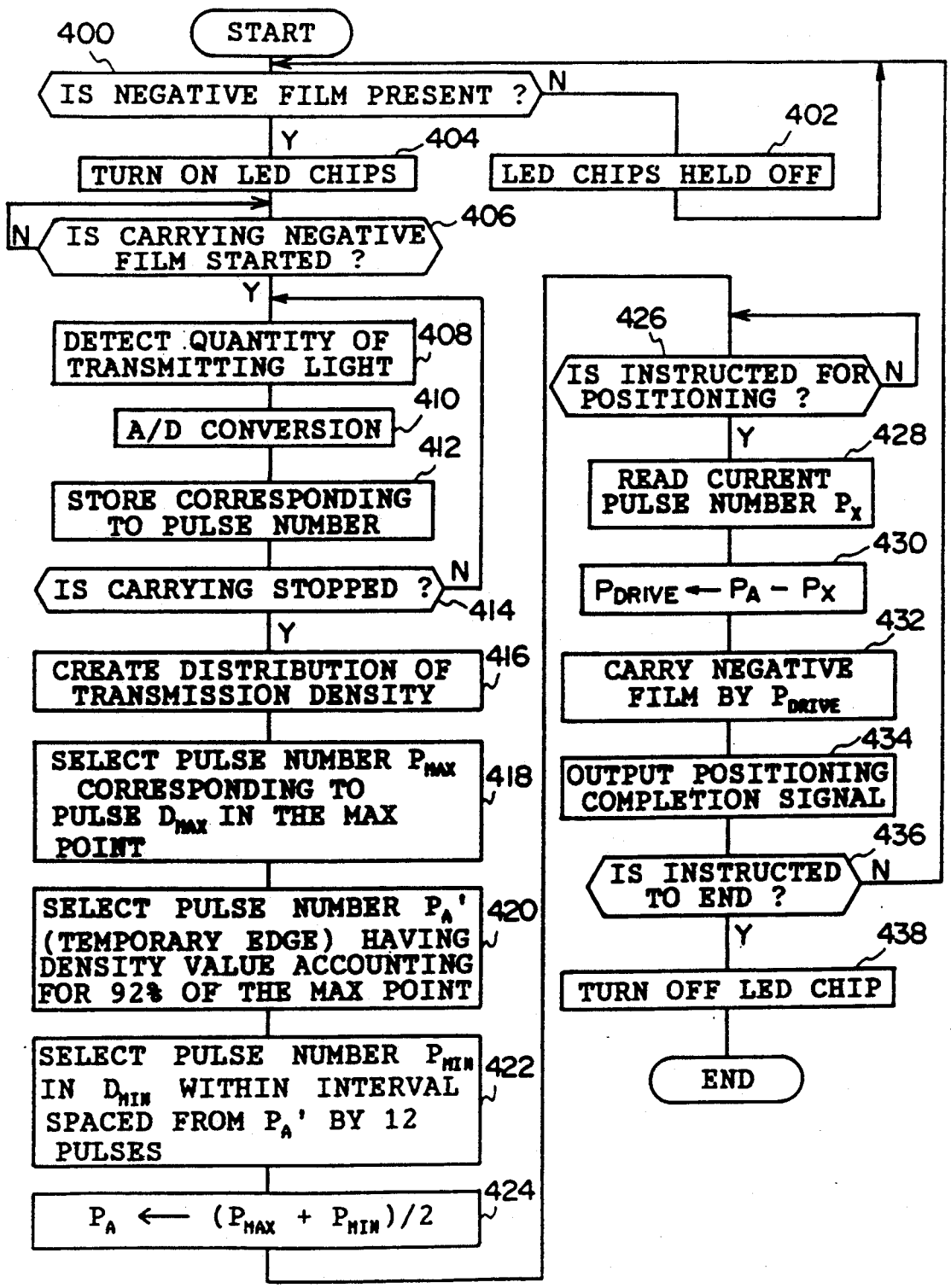
FIG. 12 is a control flowchart of positioning of the image frame.

Referring now to the flowchart of FIG. 12, a positioning procedure of the image frame will be described hereinafter.

First, in Step 400, a negative film presence or absence sensor 276 determines whether or not the negative film 16 is inserted into the negative carrier 18. If the negative film 16 is not inserted, the operation proceeds to Step 402 where the LED chips 258 are held off. If the negative film 16 is inserted, the operation proceeds to Step 404 where the LED chips 258 are turned on. Accordingly, since the LED chips are used for light sources, ON-OFF control of the LED chips 258 is very easy and the LED chips life should not be reduced.

Next, if it is determined that carrying the negative film 16 is started to position the negative film 16 at the printing position in Step 406, the operation proceeds to Step 408 to detect quantity of transmitted light which passes through the slit hole 256 to permeate through the negative film 16. Consequently, in Step 410, the quantity of the transmitted light is converted into digital signals in the A/D convertor 308. Each converted data is stored corresponding to the feed pulse number (in Step 412).

The Steps 408, 410, and 412 are repeated until, in the next Step 414, it is determined that the negative film 16 is stopped carrying. If, in Step 414, it is determined that the negative film 16 is stopped carrying, the operation proceeds to Step 416 where a distribution of transmission density in one carrying step is created based on the stored data. In Step 418, the maximum point (the maximum density value) is selected in the created distribution of the transmission density to set a feed pulse number $P_{MAX}$ corresponding to the maximum point. In Step 420, a feed pulse number $P_A'$ having a density value accounting for 92% of the maximum point is defined as a temporary edge. In Step 422, the minimum point (the minimum density value) is selected within the interval having a predetermined pulse (12 pulses in the embodiment) measured from the temporary edge $P_A'$. Accordingly, a feed pulse number $P_{MIN}$ corresponding to the minimum point is set. In Step 424, a middlemost position between the feed pulse number $P_{MAX}$ of the maximum point and the feed pulse number $P_{MIN}$ of the minimum point, i.e., $(P_{MAX}+P_{MIN})/2$ is calculated to set a pulse $P_A$ corresponding to the edge of the image frame 16A (16B).

The image frame edge pulse number $P_A$ is determined as described above, and is spaced at a substantially constant interval with respect to the negative film 16 which is underexposed or overexposed as well as the negative film 16 which is normally exposed. Therefore, a detecting error can be reduced in the range for positioning without adverse effects.

In Step 426, it is determined whether or not the controller 262 of the printer-processor 10 has instructed for positioning. If the controller 262 has been directed the positioning instruction, the operation proceeds to Step 428 to read a current feed pulse number $P_X$. Consequently, in Step 430, a feed amount $P_{DRIVE}$ is calculated based on the current feed pulse number $P_X$ and the image frame edge pulse number $P_A$ (using the expression: $P_{DRIVE}=P_A-P_X$).

In Step 432, the negative film 16 is carried by the calculated feed amount $P_{DRIVE}$. This carrying operation is identified as the carrying in Step 406. Namely, while the negative film 16 is carried, the edge of the image frame 16A (16B) before the preceding image frame is detected upstream the negative film 16.

In Step 434, When the image frame 16A (16B) is positioned at the printing position a positioning completion signal is output to the controller 162 of the printer-processor 10. In response to the positioning completion signal, the printer-processor 10 performs the printing process as discussed above.

In Step 436, it is determined whether or not the printing process has been instructed to stop. If the printing process has not been instructed to stop, the operation proceeds to Step 400 to continue the process. If the printing process has been instructed to stop, the operation proceeds to Step 438 where the LED chips 258 are turned off to end.

The operation as described hereinbefore is defined as an image frame positioning control. To control the image frame positioning, high-accuracy is essential for the accurate detection of the image detecting sensors 264 and the accurate interval between the mounting positions of the sensors 264 and the printing position. Accordingly, in the embodiment, the accuracy correction of the negative carrier 18 is performed before shipment.

Figure 13:
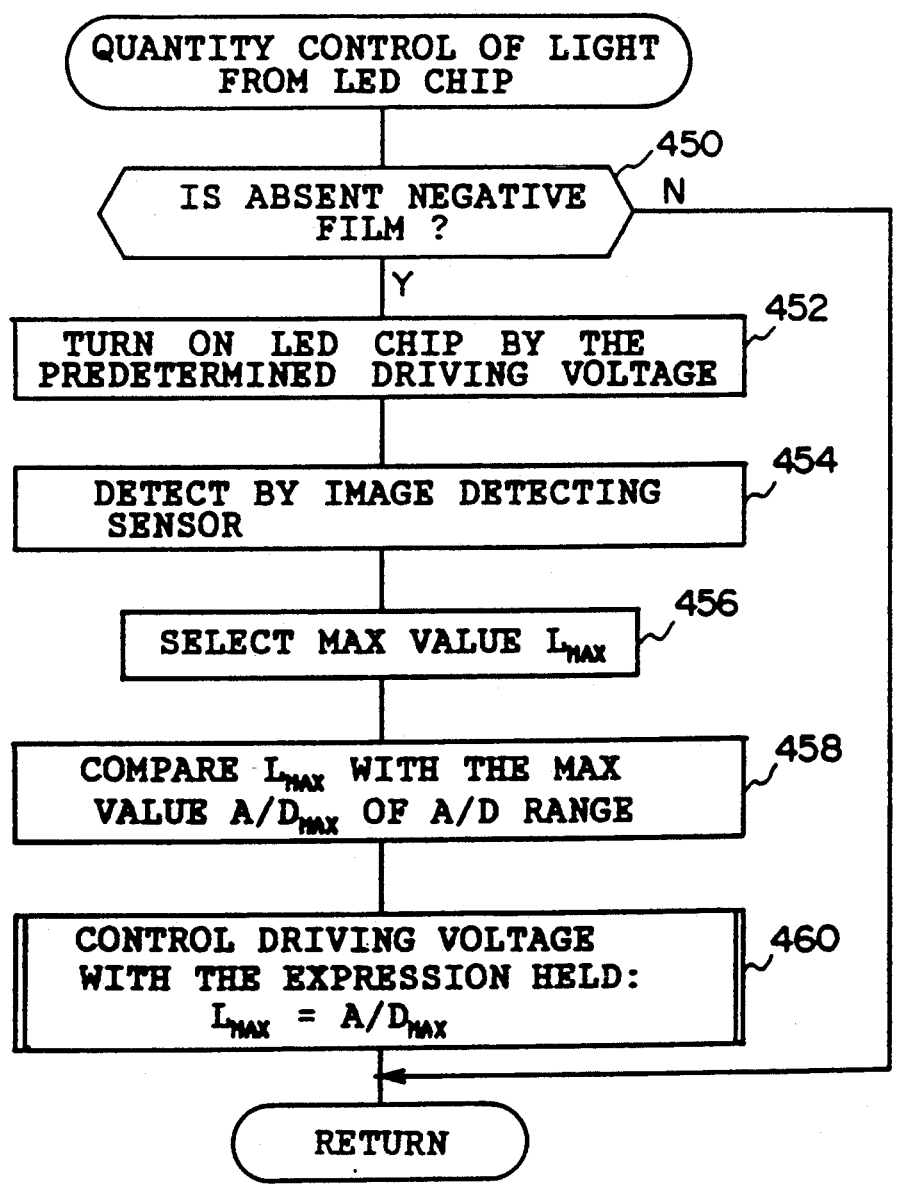
FIG. 13 is a control flowchart of adjustment of quantity of light of LED chip.

Referring now to the flowchart of FIG. 13, a description will be given of the procedure to adjust quantity of light emitted from the LED chips 258. The quantity of light emitted from the LED chips 258 is detected by the image plane sensors 264, and converted into digital data by the A/D converter 308. The A/D converter 308 has a limited range for conversion. Thus, when absence of the negative film 16 is detected in Step 450, the LED chips 258 are turned on in Step 452. The quantity of light is detected by the respective image detecting sensors 264 (in Step 454), and in Step 456, the respective top values in the detected quantity of light are selected by the respective image detecting sensors 264 to determine the maximum value of the top values.

The selected maximum value $L_{MAX}$ of the quantity of light is compared with the maximum range $A/D_{MAX}$ of the A/D converter 308 (in Step 458). In Step 460, driving voltage applied by LED drivers 300 is controlled such that the maximum value $L_{MAX}$ is given by the expression: $L_{MAX}=AD/_{MAX}$. Therefore, the detected values in the image detecting sensors 264 never depart from a dynamic range of the A/D converter 308, and the A/D converter 308 is ensured to read data. Additionally, since the LED chips 258 are applied to the light source, it is very easy to adjust or control the quantity of light.

Figure 14:
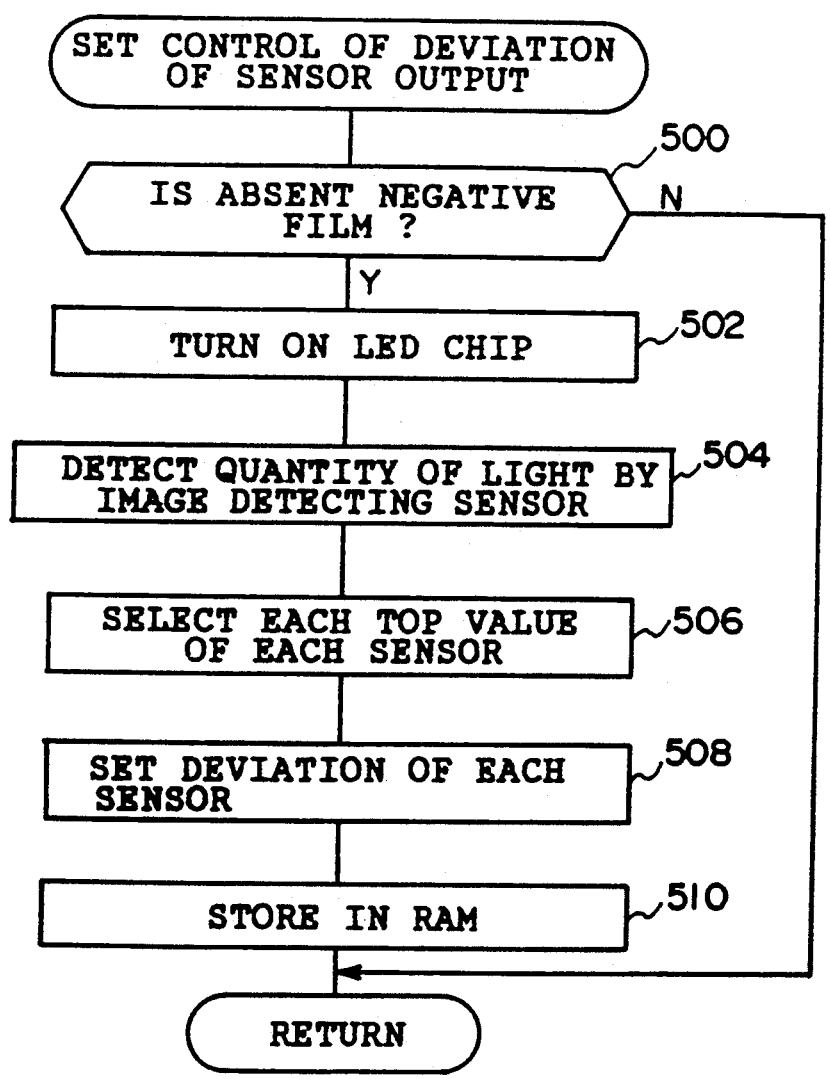
FIG. 14 is a control flowchart of compensation of a deviation of a sensor output.

The four image detecting sensors 264 detect with each slight error (a deviation) due to its detecting accuracy or effect caused by temperature change even if detecting the same quantity of light. It is desirable to have the same output from the image detecting sensors 264 when detecting the same quantity of light. Thus, the deviation should be compensated. Referring now to the flowchart of FIG. 14, a description will be given of a set control procedure of a deviation of sensor output.

When absence of the negative film 16 is determined in Step 500, the LED chips 258 are lit up in Step 502. The quantity of light is detected by each image detecting sensor 264 (in Step 504), and in Step 506, the respective top values are selected in the detected values of the respective image detecting sensors 264. Thus far, the control is effected as in the case of the quantity control of light of the LED chips shown in FIG. 13. Therefore, the top values may be stored when the top values have been selected in the quantity control of light of the LED chips in Step 456 shown in FIG. 13.

In Step 508, the top output value of one sensor is defined as a reference value to determine the deviations of the top output values of the remaining three sensors. In Step 510, the deviation is stored as a correction coefficient $\alpha$ of each image detecting sensor 264.

It is assumed that, for example, the image detecting sensors 264 are $S_A$, $S_B$, $S_C$, $S_D$, respectively. If the quantity of light is expressed on the basis of the sensor $S_A$ ($S_A=1.0$) and the outputs of the remaining sensors are $S_B=0.9$, $S_C=0.8$, $S_D=0.9$, the respective correction coefficients are $\alpha S_A=1.00$, $\alpha S_B=1.11$, $\alpha S_C=1.25$, $\alpha S_D=1.11$. Namely, the respective correction coefficients $\alpha$ stored in Step 510 are multiplied by data input from each image detecting sensor 264 when the data are input. Accordingly, it is possible to use appropriate values in the A/D conversion and create a high-accurate distribution of transmission density.

Figure 15:
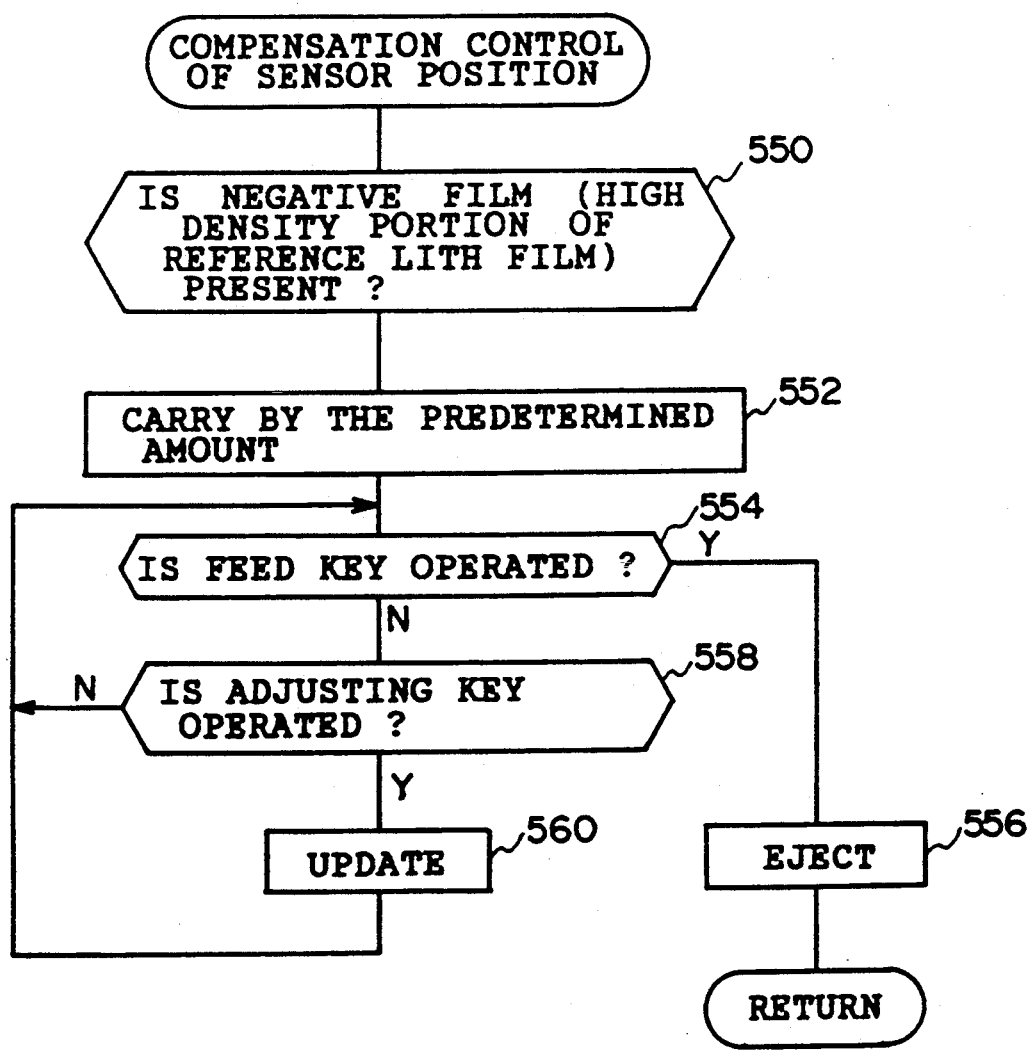
FIG. 15 is a control flowchart of compensation of mounting accuracy of a sensor.

Mounting position of each sensor (the image detecting sensor 264, the bar code sensor 282, the tape sensor 274, the negative film presence or absence sensor 276) is determined on the basis of one side (reference side) of the printing opening 206 at the printing position of the image frame. The respective distances between each sensor and the reference side are defined as the feed pulse number of the pulse motor 218. However, if the respective distances deviate when assembling the negative carrier 18, the respective distances are not identical with the predetermined pulse numbers. Hence, it is necessary to compensate the feed pulse number determined in the design stage, according to the mounting accuracy. Referring now to the flowchart of FIG. 15, a description will be given of the accuracy correction of the sensor mounting.

Though the position correction of each sensor is independently performed, the same process is provided for each sensor. Thus, as an example, the position correction of the negative film presence or absence sensor 276 will be described hereinafter. In Step 550, it is determined whether or not a reference lith film is detected. The reference lith film is a type of a film for photomechanical process, which has a high density (opaque) portion at the intermediate position of a low density (substantially transparent) portion and a clear edge. The reference lith film is substituted for the negative film 16.

The transparent portion is undetectable in the operation. When a boundary between the transparent portion and the high density portion is detected, the operation proceeds from Step 550 to Step 552 to carry the reference lith film by the predetermined amount. The predetermined amount is defined as a carrying amount to position the predetermined detecting point on the right side of the printing opening 206.

In Step 554, the operator detects whether or not the edge between high and low density sides corresponds to the right side of the printing opening after the reference lith film is carried by the predetermined amount. If they correspond with each other, a feed key is operated to eject the reference lith film. Operation of the feed key causes the operation to proceed from Step 554 to Step 556, and eject the reference lith film 312 to end.

If the feed key is not operated, the operation proceeds from Step 554 to Step 558. In Step 558, it is determined whether or not a fine adjustment key are operated to finely adjust. If not, the operation is repeated between Step 554 and Step 558. In Step 558, if the fine adjustment keys 310B, 310C are operated, the reference lith film is slightly moved according to the key operation to position the edge between the high and low density sides on the right side of the printing opening 206.

After the fine adjustment in Step 558 (i.e., after one adjustment step), the operation proceeds to Step 560 to update the predetermined amount after the adjustment. The operation proceeds to Step 554.

The process as described hereinbefore is repeatedly operated until the edge between the high and low density sides is surely positioned on the right side of the printing opening 206 by carrying the reference lith film by the predetermined amount in Step 552. Thus, accuracy of the mounting position is completely compensated.

In other sensors, the operation can be performed as in the case of the operation procedure as described above simply by selecting which sensor is used to detect in Step 550. Therefore, the feeding amount can be stored for the accurate position in spite of errors when assembling the sensors. Thus, it is possible to facilitate a simple mounting operation, and improve the operation efficiency.

Meanwhile, if the four image detecting sensors 264 are not in parallel with the image frame edge, the image frame edge may be shifted to a considerable extent. However, if the above compensation is performed, the four image detecting sensors 264 are apparently disposed in parallel with the image frame edge. As a result, it is ensured to detect the image frame edge.

A second embodiment will be described hereinafter.

As shown in FIG. 17, the negative film 16 may have a frame mark 265 slightly projecting from each image frame edge. The frame mark 265 is exposed during photographing by a camera to have a high density. Accordingly, the frame mark 265 has a low transmission density, and is apt to be defined as a part of the image. When one of scanning lines of the image detecting sensors 264 passes across the frame mark 265, an output value of each sensor varies from each other. Further, a distribution of the density is varied depending on a photographing condition of an image. Thus, in the embodiment, the image detecting sensor 264 disposed corresponding to the highest density position is defined as a first sensor, and the image detecting sensor 264 disposed corresponding to the lowest density position is defined as a second sensor. Each output value of the image detecting sensor 264 is selected so that it is determined whether or not the detected values are appropriate according to the difference between the respective output values.

Figure 18A:
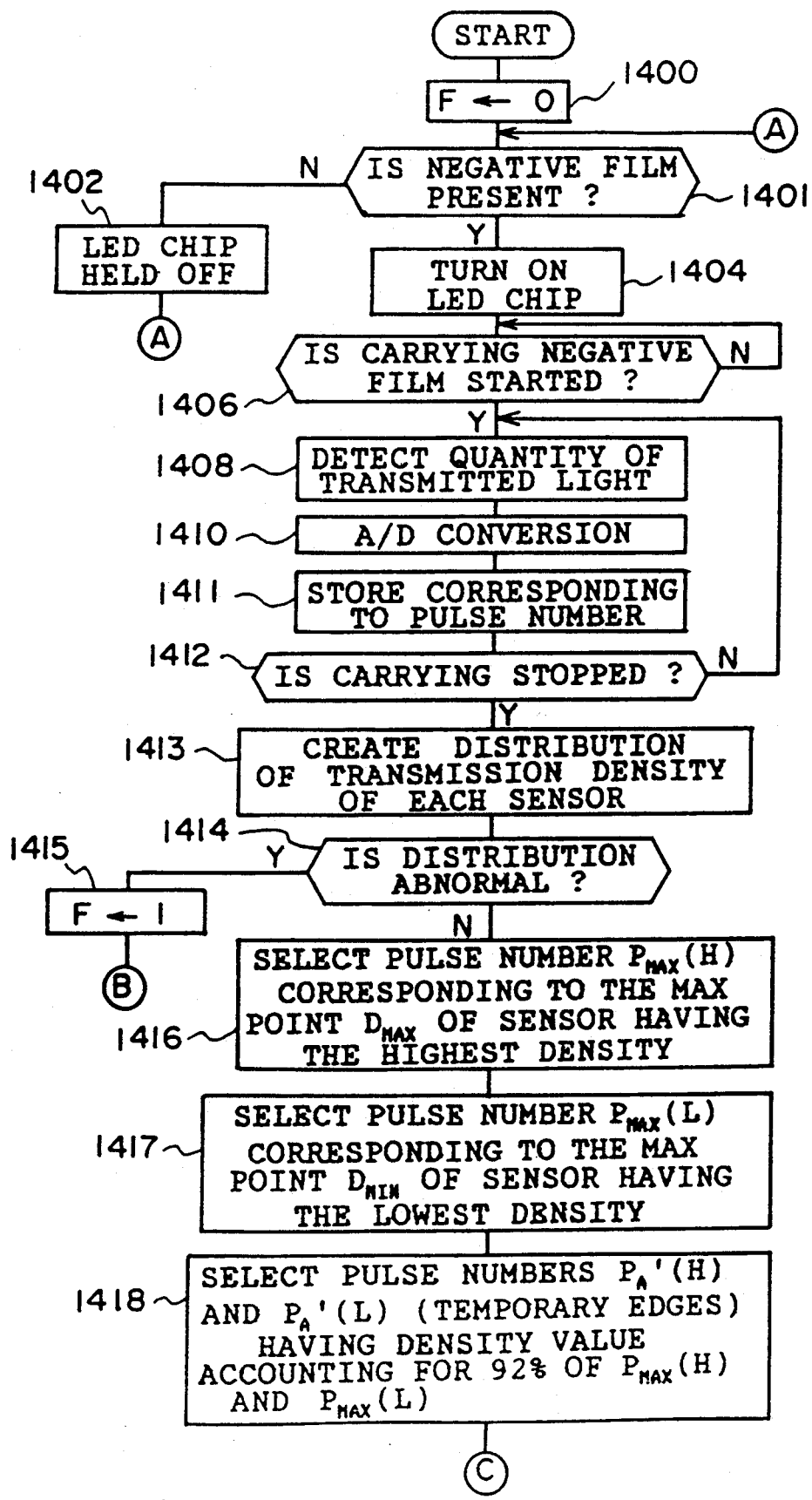
FIGS. 18A and 18B are flowcharts of positioning the image frame according to the second embodiment.
Figure 18B:
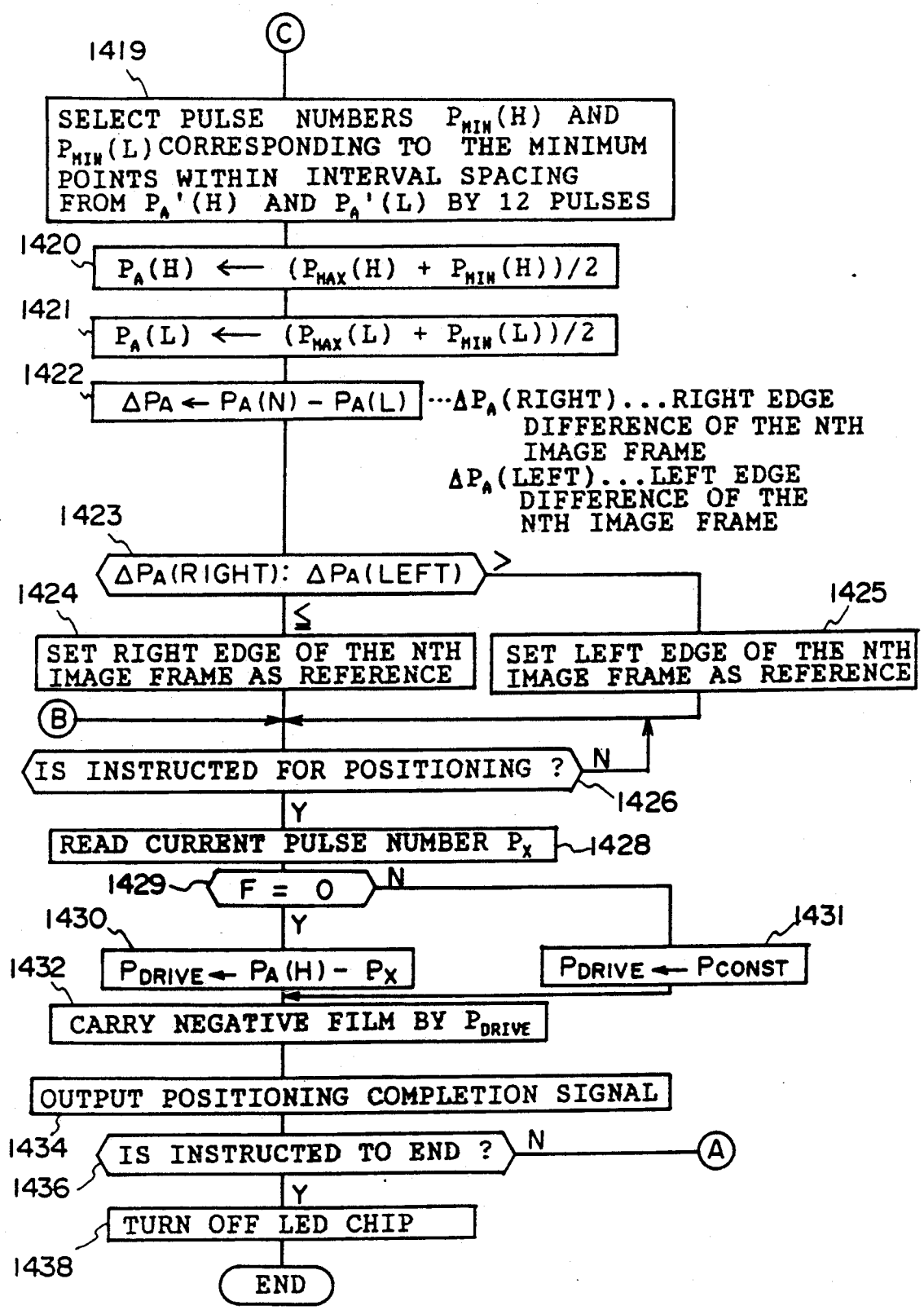

Referring now to the flowcharts of FIGS. 18A and 18B, a positioning procedure of the image frame will be described hereinafter.

First, in Step 1400, a flag F is reset to zero. Next, in Step 1401, a negative film presence or absence sensor 276 determines whether or not the negative film 16 is inserted into the negative carrier 18. If the negative film 16 is not inserted, the operation proceeds to Step 1402 where the LED chips 258 are held off. If the negative film 16 is inserted, the operation proceeds to Step 1404 where the LED chips 258 are turned on. Accordingly, since the LED chips are used for light sources, ON-OFF control of the LED chips 258 is very easy and the LED chips life should not be reduced.

Next, if it is determined that carrying the negative film 16 is started to position the negative film 16 at the printing position in Step 1406, the operation proceeds to Step 1408 to detect a quantity of transmitted light which passes through the slit hole 256 to permeate through the negative film 16. Consequently, in Step 1410, the quantity of transmitted light is converted into digital signals in the A/D convertor 308. Each converted data is stored corresponding to the feed pulse number (in Step 1411).

The Steps 1408, 1410, and 1411 are repeated until, in the next Step 1412, it is determined that the negative film 16 is stopped carrying. If, in Step 1412, it is determined that the negative film 16 is stopped carrying, the operation proceeds to Step 1413 where each distribution of transmission density of the respective four sensors in one carrying step is created based on the stored data.

In Step 1414, it is determined whether or not there is an abnormal distribution of the transmission density. Namely, the abnormal distribution of the transmission density is detected if the image frame 16A (16B) has a half fog, an unexposed portion, or is in an underexposure condition or an overexposure condition. If the abnormal distribution is detected in Step 1414, it is determined that the image frame edge is undetectable. The operation proceeds to Step 1415 where a flag F is set to 1. Thereafter, the operation proceeds to Step 1426 as described later.

If it is determined that the distribution of the transmission density is normal in Step 1414, it is determined the frame edge is detectable, and the operation proceeds to Step 1416.

In Step 1416 a pulse number $P_{MAX}(H)$ of a maximum point $D_{MAX}$ of the sensor (the first sensor) disposed corresponding to the highest density position in the four sensors is selected. Subsequently, in Step 1417, a pulse number $P_{MAX}(L)$ of a maximum point $D_{MIN}$ of the sensor (the second sensor) disposed corresponding to the lowest density position in the four sensors is selected. In Step 1418, feed pulse numbers $P_A'(H)$ and $P_A'(L)$ having density values accounting for 92% of the maximum points are determined and are defined as temporary edges. In Step 1419, the minimum point is selected within an interval having a constant pulse (12 pulses in the embodiment) as measured from the temporary edge $P_A'$. Thus, feed pulse numbers $P_{MIN}(H)$ and $P_{MIN}(L)$ corresponding to the minimum points are set. In Step 1420, an average between the maximum point feed pulse $P_{MAX}(H)$ and the minimum point feed pulse $P_{MIN}(H)$, i.e., $(P_{MAX}(H) + P_{MIN}(H))/2$ is calculated to set a pulse $P_A(H)$ corresponding to an edge of the image frame 16A (16B). In Step 1421, as in the case of Step 1420, an average between the maximum point feed pulse $P_{MAX}(L)$ and the minimum point feed pulse $P_{MIN}(L)$, i.e., $(P_{MAX}(L) + P_{MIN}(L))/2$ is calculated to set a pulse $P_A(L)$ corresponding to the edge of the image frame 16A (16B).

In Step 1422, a difference $\Delta P_A$ between the pulse $P_A(H)$ and the $P_A(L)$ is found. The difference $\Delta P_A$ can be obtained every carrying step at two points, i.e., at the right edge of the Nth frame (the image frame having a detectable edge), centered maximum point. Next, in Step 1423, the right edge $\Delta P_A$ of the (N−1)th frame detected in the preceding Step is compared with the left edge $\Delta P_A$ of the (N−1)th frame detected in the present Step. In Steps 1424 and 1425, a lower $\Delta P_A$ of the two differences $\Delta P_A$ is selected. An edge detecting point corresponding to $P_A(H)$ of the selected difference $\Delta P_A$ is defined as a reference point (if the differences $\Delta P_A$ are identical with each other, the right edge of the (N−1)th frame is selected).

The image frame edge pulse number $P_A$ is determined as described above, and is spaced at a substantially constant interval with respect to the negative film 16 which is underexposed or overexposed as well as the negative film 16 which is normally exposed. Therefore, a detecting error can be reduced in the range for positioning without adverse effects.

In addition, even if the negative film 16 has a frame mark, it is ensured to detect the image frame edge.

In Step 1426, it is determined whether or not the controller 262 of the printer-processor 10 has instructed for positioning. If instructed for positioning, the operation proceeds to Step 1428 to read a current feed pulse number $P_X$. Subsequently, in Step 1429, it is determined whether or not the flag F is reset. If the flag F is reset, the operation proceeds to Step 1430 for positioning on the basis of the detected edge. In Step 1430, a feed amount $P_{DRIVE}$ is calculated based on the current feed pulse number $P_X$ and the image frame edge pulse $P_A$ (using the expression: $P_{DRIVE} = P_A - P_X$). Thereafter, the operation proceeds to Step 1432.

If it is determined that the flag F is not reset in Step 1429, the operation proceeds to Step 1431 where the current feed pulse $P_X$ is subtracted from a constant feed amount $P_{CONST}$ measured from the preceding position for positioning, and the defined difference is substituted for the feed amount $P_{DRIVE}$. Thereafter, the operation proceeds to Step 1432.

In Step 1432, the negative film is carried by the calculated feed amount $P_{DRIVE}$. This carrying step is defined as the carrying step in the Step 1406. Namely, it is possible to detect the edge of the image frame 16A (16B) immediately following the next image frame upstream the positioning point while the negative film is carried for positioning.

When the selected image frame 16A (16B) is positioned at the printing position, in Step 1434, the positioning completion signal is output to the controller 162 of the printer-processor 10. The printing process as discussed above can be performed in response to the positioning completion signal in the printer-processor 10.

In Step 1436, it is determined whether or not the printing process has been instructed to end. If not instructed, the operation proceeds to Step 1400. If instructed, the operation proceeds to Step 1438 where LED chip 258 is turned off to end.

As described above, in the embodiment, two edges (the front edge of the Nth image frame and the backward edge of the (N−1)th image frame) are detected. That is to say, a boundary between the Nth image frame and the base portion, and a boundary between the (N−1)th image frame and the base portion are detected. The right edge and the left edge of the image frame to position are compared with each other to select a more appropriate edge for using as a positioning reference. Since the selected edge is used a positioning reference, it is possible to detect the image frame edge accurately even if the negative film 16 has, for example, a frame mark 265 as shown in FIG. 16. As a result, the accurate positioning can be performed.

As discussed hereinbefore, the image frame detecting apparatus according to the present invention has a superior advantage. That is to say, it is possible to provide the apparatus which can accurately detect an image frame edge all the time irrespective of an accuracy, a performance or the like of adjustment for the quantity of light. The object ma be attained by detecting the image frame edge depending upon a relative difference of densities in the range detected in a single step.

In the method of detecting the image frame, the photographic film carrier according to the present invention has some excellent effects. Namely, an extended life of the photographic film carrier allows to improve the maintenance efficiency. The photographic film carrier has a reduced fluctuation of the quantity of light of temperature change. Furthermore, an initial adjustment of the quantity of light can be easily performed, and the image frame can be surely positioned at the printing position.

What is claimed is:

1. An image frame detecting apparatus comprising:
   a light emitting portion provided in one of respective sides of a guide path for a carrying photographic film, and including a light emitting diode (LED) array having a plurality of LEDs disposed in a transverse direction of said photographic film;
   a light receiving portion, having multiple sensors, provided in another of said respective sides of said guide path for said photographic film, and receiving light emitted from said light emitting portion; and
   a detecting portion for detecting edges of an image frame recorded on said photographic film depending upon a difference between a quantity of light received by adjacent sensors, said edges being aligned parallel to said guide path.

2. An image frame detecting apparatus according to claim 1, wherein the number of said plurality of LED can be determined such that at least two colors are emitted from said LEDs and quantities of each emitted color light being identical with each other.

3. An image frame detecting apparatus according to claim 1, wherein said plurality of LEDs are turned on only when said photographic film is carried.

4. An image frame detecting apparatus according to claim 1, wherein said detecting portion detects a splice tape for coupling said photographic films with each other, a managing tape pasted on each photographic film, and a notch provided corresponding to each image frame/depending upon the quantity of light received by said light receiving portion.

5. An image frame detecting apparatus according to claim 1, wherein said detecting portion obtains a distribution of a transmission density of said photographic film based on output signals from said multiple sensors, said detecting portion identifying a boundary between said image frame and a base portion of the photographic film based on said distribution of the transmission density.

6. An image frame detecting apparatus according to claim 1, wherein said photographic film contains full size images and panoramic images having different widths in a direction transverse to said guide path, said light receiving portion having at least one sensor aligned along said photographic film at a position inside a width of said panoramic image and at least one sensor aligned along said photographic film at a position outside a width of said panoramic image.

7. An image frame detecting apparatus according to claim 6, wherein said detecting portion compares an output signal of said one sensor inside said width of the panoramic image with an output of said at least one sensor outside said width of said panoramic image to determine at least one image frame edge aligned parallel to the guide path.

8. A method of detecting an image frame edge recorded on a carrying photographic film said method comprising the steps of:
   (a) adjusting the maximum value in quantities of light emitted from a plurality of LEDs arranged in the transverse direction of said photographic film to the range of a quantity of light which can be received by a plurality of light receiving portions in the condition where said photographic film is absent, and determining a correction of said quantity of received light depending upon an error of said quantity of received light in said respective light receiving portions; and
   (b) detecting the image frame edge depending upon a distribution of transmission density of said photographic film which can be obtained after correcting said quantity of receiving light.

9. A method of detecting an image frame edge according to claim 8, wherein, in said step (b), a temporary edge is defined depending upon the maximum point of the quantity of received light, the minimum point being determined within the range having a predetermined interval from said temporary edge, and a middlemost position between the maximum point and the minimum point of said quantity of received light being defined as an image frame edge.

10. A photographic film carrier used for carrying a photographic film on which image frames are consecutively recorded, and for positioning each image frame at a printing position in order, said photographic film carrier comprising:
   a base having a pass opening for exposing light provided at said printing position, and having guide path for guiding said photographic film;
   a cover body which can be opened and closed on said guide path of said base;
   a plurality of LEDs arrayed in the transverse direction of said photographic film upstream said printing position of said guide path, and passing light through said photographic film positioned on said guide path;
   a sensor means mounted on said cover body to detect transmitted light passing through said photographic film from said LEDs; and
   a positioning control means for discriminating the image frame edge depending upon the quantity of received light detected by said sensor means to position said image frame at said printing position.

11. A photographic film carrier according to claim 10, wherein said sensor means comprises a plurality of image detecting sensors arranged along the transverse direction of said photographic film, and said photographic film carrier further comprising a determining means for determining depending upon a quantity of transmission density of said respective photographic films detected by said plurality of image detecting sensors whether said image frame recorded on said photographic film is a standard size image frame or a panoramic size image frame.

12. A photographic film carrier according to claim 11 further comprising a passing means for passing said image frame having a different size through said printing position when an image frame size determined by said determining means differs from an image frame size of said image frame which should be positioned at said printing position by said photographic film carrier.

13. A photographic film carrier according to claim 10, wherein said plurality of LEDs are arranged to transmit light through said photographic film disposed on said guide path via a slit hole provided in said guide path.

14. A method of printing a photographic film using a photoprinter including a switching means for enabling a negative mask for a standard size image frame and a negative mask for a panoramic size image frame to be switched over from one to another, and a an image frame detecting apparatus detecting an image frame edge of said photographic film depending upon a quantity of transmission light of said photographic film carried on said guide path, said quantity of transmitted light received by a light receiving position upstream said printing opening, said method comprising the steps of:
   arraying a plurality of sensors along the transverse direction of said photographic film to form said light receiving portion, arranging at least one sensor of said plurality of sensors within a detecting range of a standard size image frame and outside a detecting range of a panoramic size image frame, and thereby, discriminating an image frame size; and
   skipping an image frame having a size which is not identical with a size of a negative mask disposed on said printing opening, and printing an image frame having the same size as that of said negative mask.

15. A method of positioning an image frame, in which light emitted from a light emitting portion disposed at one of positions facing each other with a guide path between is received by said light receiving portion disposed at the other of the positions an image frame edge recorded on said photographic film is detected depending upon a quantity of said received light, and said detected image frame edge is positioned at a predetermined position, said method comprising the steps of:
   arraying a plurality of sensors along the transverse direction of said photographic film to form said light receiving portion, determining the maximum point of a first sensor disposed at a position having the highest distribution of the quantity of light received by each sensor and the minimum point of a second sensor disposed at a position having the lowest distribution of the quantity of received light while said photographic film is being carried from a substantial intermediate portion of the (N−1)th image frame to a substantial intermediate portion of the Nth image frame;

detecting a front edge of said Nth image frame and a back edge of said (N−1)th image frame, selecting any one edge having a lower difference of two differences, said two differences between an edge position depending upon the maximum point of said first sensor and an edge position depending upon the maximum point of said second sensor are detected at said front edge of the preceding Nth image frame already detected and at the back edge the current Nth image frame detected at present.

16. A method of positioning an image frame according to claim 15, wherein, in said two edges on said selected side, said image frame edge determined depending upon the maximum point of said first sensor is defined as a reference for positioning.

17. A method of positioning an image frame according to claim 15, wherein a temporary edge is defined depending upon said maximum point, the minimum point being determined within the range having a predetermined interval from said temporary edge, and a middlemost position between said maximum point and said minimum point of said quantity of received light being defined as said image frame edge.

18. A method of positioning an image frame according to claim 15, wherein said Nth image frame is carried by a predetermined interval from a stop position of said (N−1)th image frame for positioning when said image frame edge may not be detected.

19. An image frame detecting apparatus comprising:

a light emitting portion provided in one of respective sides of a guide path for a carrying photographic film, and including a light emitting diode (LED) array having a plurality of LEDs disposed in a transverse direction of said photographic film;

a light receiving portion provided in another of said respective sides of said guide path for said photographic film, and receiving light emitted from said light emitting portion; and a detecting portion for detecting an image frame recorded on said photographic film depending upon a quantity of light received by said light receiving portion, wherein a number of said plurality of LEDs can be determined such that at least two colors are emitted from said LEDs and quantities of each emitted color light being identical with each other.

20. An image frame detecting apparatus comprising:

a light emitting portion provided in one of respective sides of a guide path for a carrying photographic film, and including a light emitting diode (LED) array having a plurality of LEDs disposed in a transverse direction of said photographic film;

a light receiving portion provided in another of said respective sides of said guide path for said photographic film, and receiving light emitted from said light emitting portion; and a detecting portion for detecting an image frame recorded on said photographic film depending upon a quantity of light received by said light receiving portion, wherein said detecting portion detects a splice tape for coupling said photographic films with each other, a managing tape pasted on each photographic film, and a notch provided corresponding to each image frame depending upon the quantity of light received by said light receiving portion.

* * * * *